US011693710B1

(12) United States Patent
Aleti et al.

(10) Patent No.: US 11,693,710 B1
(45) **Date of Patent: *Jul. 4, 2023**

(54) WORKLOAD POOL HIERARCHY FOR A SEARCH AND INDEXING SYSTEM

(71) Applicant: Splunk Inc., San Francisco, CA (US)

(72) Inventors: Bharath Kishore Reddy Aleti, San Ramon, CA (US); Alexandros Batsakis, San Francisco, CA (US); Mitchell Neuman Blank, London (GB); Rama Gopalan, Saratoga, CA (US); Hongxun Liu, Palo Alto, CA (US); Anish Shrigondekar, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,722

(22) Filed: Jan. 31, 2022

Related U.S. Application Data

(63) Continuation of application No. 16/147,251, filed on Sep. 28, 2018, now Pat. No. 11,385,936.

(51) Int. Cl.

| | |
|---|---|
| ***G06F 16/00*** | (2019.01) |
| ***G06F 7/00*** | (2006.01) |
| ***G06F 9/50*** | (2006.01) |
| ***G06F 16/2455*** | (2019.01) |
| ***G06F 16/242*** | (2019.01) |
| ***G06F 16/22*** | (2019.01) |

(52) U.S. Cl.
CPC .............. *G06F 9/505* (2013.01); *G06F 16/22* (2019.01); *G06F 16/2425* (2019.01); *G06F 16/24552* (2019.01)

(58) Field of Classification Search
CPC ................. G06F 16/22; G06F 16/2425; G06F 16/24552; G06F 9/505
USPC ........................................................ 707/741
See application file for complete search history.

(56) References Cited

U.S. PATENT DOCUMENTS

| | | | |
|---|---|---|---|
| 7,941,804 | B1 | 5/2011 | Herington |
| 8,156,502 | B1 | 4/2012 | Blanding |
| 8,412,696 | B2 | 4/2013 | Zhang et al. |
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,682,925 | B1 | 3/2014 | Marquardt et al. |
| 8,738,587 | B1 | 5/2014 | Bitincka et al. |

(Continued)

OTHER PUBLICATIONS

Redhat, "Red Hat Enterprise Linux 6," Resource Management Guide, Edition 6, Oct. 20, 2017, 69 pages.

(Continued)

*Primary Examiner* — Raquel Perez-Arroyo
(74) *Attorney, Agent, or Firm* — Ferguson Braswell Fraser Kubasta PC

(57) ABSTRACT

Resource management includes storing, for multiple workload pools of a data intake and query system, a workload pool hierarchy arranged in multiple workload pool layers. After storing a processing request is assigned a selected subset of workload pools in a second layer of the workload pool hierarchy based on a type of processing request. The processing request is then assigned to an individual workload pool in the selected subset to obtain a selected workload pool. Execution of the processing request is initiated on the selected workload pool.

20 Claims, 30 Drawing Sheets

(56) References Cited

U.S. PATENT DOCUMENTS

| | | | | |
|---|---|---|---|---|
| 8,738,629 | B1 | 5/2014 | Bitincka et al. | |
| 8,788,525 | B2 | 7/2014 | Neels et al. | |
| 8,788,526 | B2 | 7/2014 | Neels et al. | |
| 8,826,434 | B2 | 9/2014 | Merza | |
| 8,983,994 | B2 | 3/2015 | Neels et al. | |
| 9,208,240 | B1 | 12/2015 | Anton | |
| 10,621,001 | B1 * | 4/2020 | Braverman | G06F 9/4881 |
| 2005/0149908 | A1 | 7/2005 | Klianev | |
| 2008/0271039 | A1 | 10/2008 | Rolia et al. | |
| 2011/0288847 | A1 | 11/2011 | Narayanan et al. | |
| 2013/0326620 | A1 | 12/2013 | Merza et al. | |
| 2014/0068550 | A1 | 3/2014 | Simitsis | |
| 2014/0214888 | A1 | 7/2014 | Marquardt et al. | |
| 2014/0236889 | A1 | 8/2014 | Vasan et al. | |
| 2014/0236890 | A1 | 8/2014 | Vasan et al. | |
| 2014/0324862 | A1 | 10/2014 | Bingham et al. | |
| 2014/0330815 | A1 | 11/2014 | Bitincka et al. | |
| 2014/0344256 | A1 | 11/2014 | Bitincka et al. | |
| 2015/0019537 | A1 | 1/2015 | Neels et al. | |
| 2015/0033332 | A1 | 1/2015 | Merza | |
| 2015/0033333 | A1 | 1/2015 | Merza | |
| 2015/0113540 | A1 * | 4/2015 | Rabinovici | G06F 9/4881 718/104 |
| 2015/0142847 | A1 | 5/2015 | Neels et al. | |
| 2015/0339344 | A1 | 11/2015 | Neels et al. | |
| 2016/0004750 | A1 | 1/2016 | Marquardt et al. | |
| 2016/0036850 | A1 | 2/2016 | Merza | |
| 2016/0036851 | A1 | 2/2016 | Merza | |
| 2016/0088125 | A1 | 3/2016 | Polychronis | |
| 2017/0220281 | A1 * | 8/2017 | Gupta | G06F 3/0604 |
| 2017/0220389 | A1 * | 8/2017 | Michael | G06F 9/5027 |
| 2019/0230155 | A1 | 7/2019 | Chin et al. | |
| 2020/0034177 | A1 * | 1/2020 | Geldart | G06F 9/5027 |

OTHER PUBLICATIONS

Splunk Inc., "Achieve Search and Ingest Isolation via Resource Management in a Search and Indexing System", U.S. Appl. No. 16/147,251, including its prosecution history; filed Sep. 28, 2018, 605 pages.

Splunk Inc., "Dynamic Reassignment of Search Processes into Workload Pools in a Search and Indexing System", U.S. Appl. No. 16/147,262, including its prosecution history; filed Sep. 28, 2018, 354 pages.

* cited by examiner

602
Original Search:
Search "error" | stats count BY host

604
Sent to peers:
Search "error" | prestats count BY host

606
Executed by search head:
Aggregate the prestats results received from peers

FIG. 6

FIG. 32
3200
Job Settings
Owner
admin
App
search
Read Permissions
Private
Everyone
Lifetime
10 minutes
7 days
Link To Job
http://ronnie.sv.splunk.com:3000/en-US/app/s
Copy or bookmark the link by right-clicking the icon, or drag the icon into your bookmarks bar.
3206
Workload Pool
pool_1
Workload pool can only be selected for running search jobs.
3204
Cancel
Save

WORKLOAD POOL HIERARCHY FOR A SEARCH AND INDEXING SYSTEM

CROSS REFERENCE TO RELATED APPLICATIONS

This application is a continuation of, and thereby claims benefit under 35 U.S.C. § 120 to, U.S. patent application Ser. No. 16/147,251 filed on Sep. 28, 2018, which is incorporated herein by reference in its entirety.

BACKGROUND

Resource management is sharing of resources amongst multiple consumers of the resources. For computer processes, resource management is the sharing of hardware resources. For many applications, resource management is not considered at the application level. In particular, resource management is often delegated to the operating system to manage and is invisible to the application tier. For example, the operating system might give more compute cycles to user level applications and fewer compute cycles to background tasks.

BRIEF DESCRIPTION OF DRAWINGS

In the drawings:

FIG. 6 illustrates how a search query received from a client at a search head can split into two phases in accordance with a disclosed embodiment.

DETAILED DESCRIPTION

Figure 1:
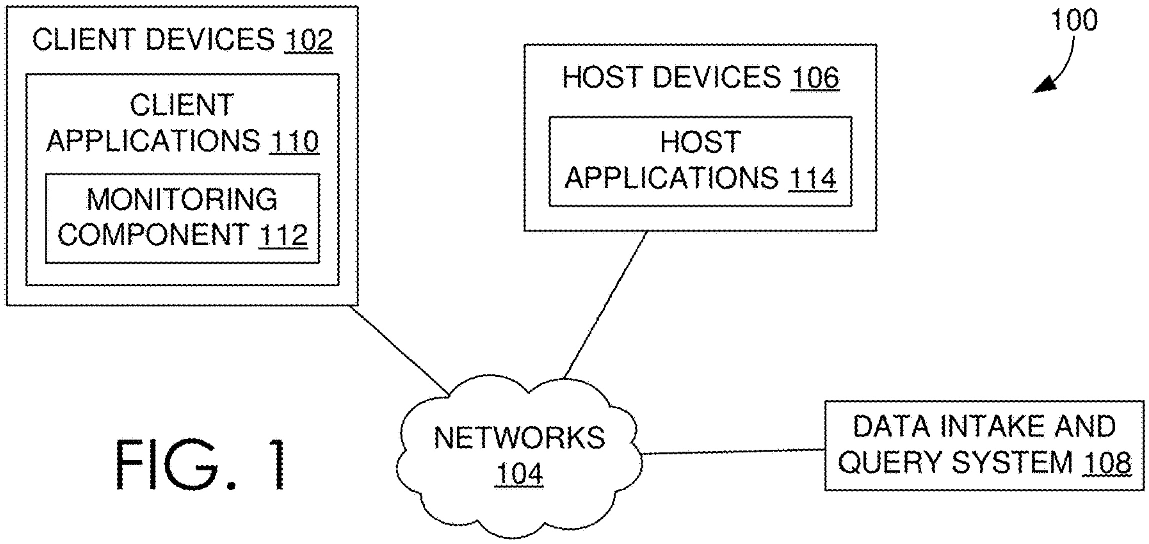
FIG. 1 illustrates a networked computer environment in which an embodiment may be implemented.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, embodiments are directed to resource management in a data intake and query system. Specifically, in a data intake and query system, events are received, indexed, and stored in a data store. Concurrently, with the storage of data, search queries may be received and processed. Data intake and search query may each involve multiple physical and/or virtual computer systems. Additionally, the processing of a search query may have unpredictability in terms of the number of hardware resources involved. For example, the number of data stores having data matching the search query may be unknown until the indexers start processing the search query.

Some search query requests and data intake requests are more critical than others. For example, a user learning how to send search queries to the data intake and query system may unintentionally cause critical searches to slow. In particular, searches that include wildcard characters may consume more hardware resources.

One or more embodiments provide explicit control for resource allocation. The explicit control is through using workload pools and having predicate based rules for assigning search query and data intake requests to the workload pools. Further, the technique of using workload pools provides guard rails to allow some processes to have access to the hardware resources.

Embodiments are described herein according to the following outline:

1.0. General Overview
2.0. Operating Environment
  2.1. Host Devices
  2.2. Client Devices
  2.3. Client Device Applications
  2.4. Data Server System
  2.5. Data Ingestion
    2.5.1. Input
    2.5.2. Parsing
    2.5.3. Indexing
  2.6. Query Processing
  2.7. Field Extraction
  2.8. Acceleration Techniques
    2.8.1. Aggregation Technique
    2.8.2. Keyword Index
    2.8.3. High Performance Analytics Store
    2.8.4. Accelerating Report Generation
  2.9. Security Features
  2.10. Data Center Monitoring
  2.11. Cloud-Based System Overview
  2.12. Searching Externally Archived Data
    2.12.1. ERP Process Features
  2.13. IT Service Monitoring
  2.14. Cloud-Based Architecture
3.0. Resource Management
4.0. Hardware

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As an example, the client application may be a web application that is served to and displayed in a web browser or other local application. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on Oct. 27, 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
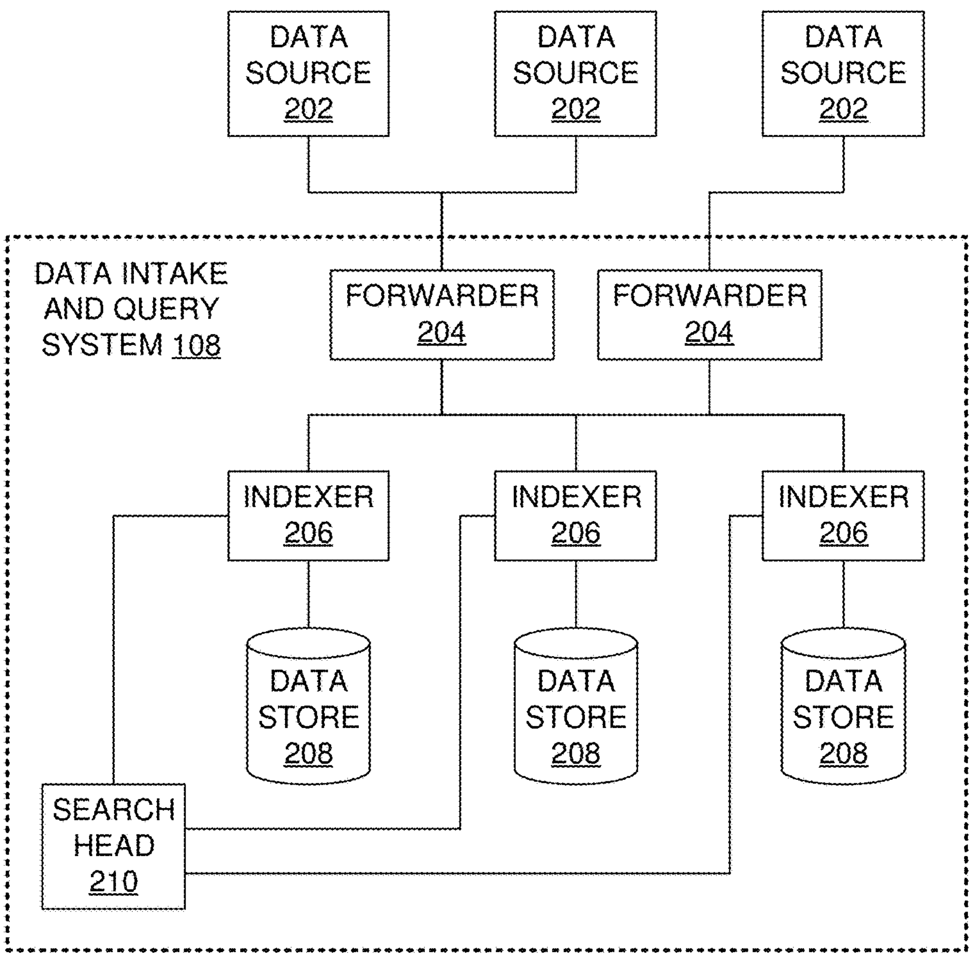
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
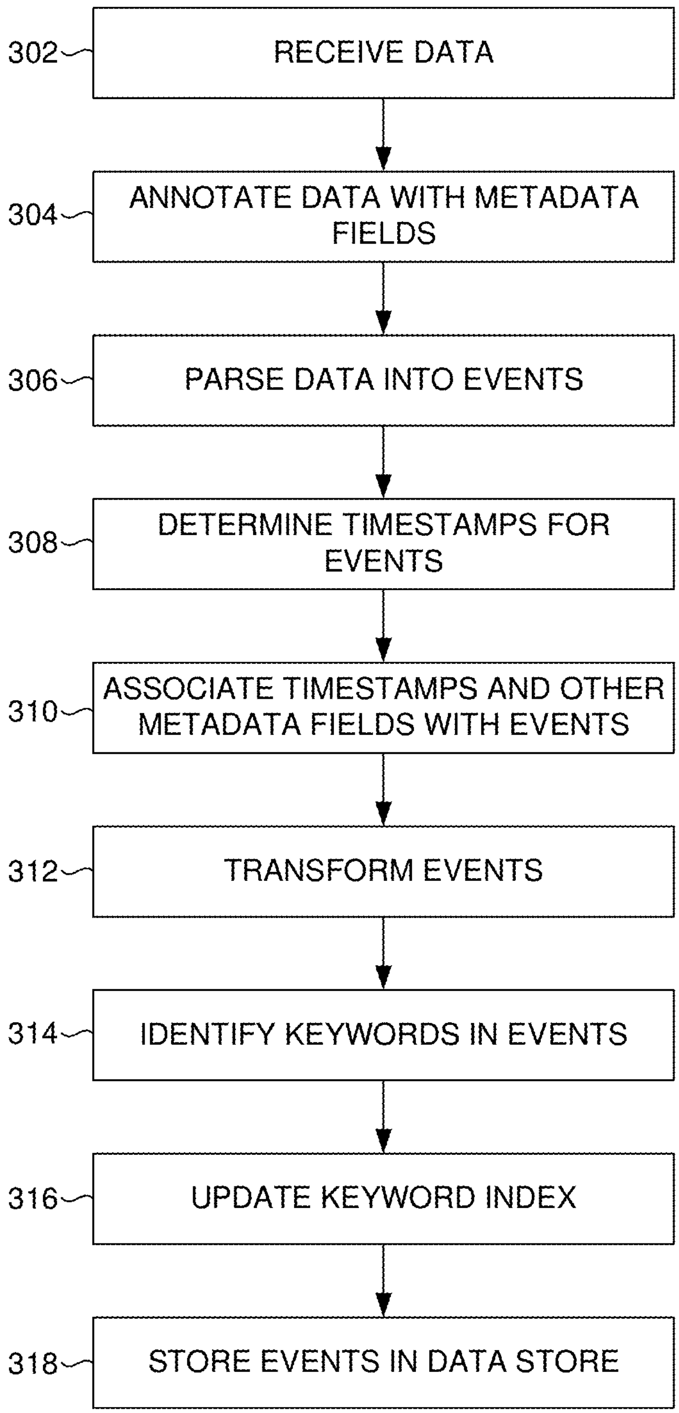
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events and may also include one or more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equal sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on Apr. 30, 2014, and in U.S. patent application Ser. No. 14/266,817, entitled "MULTI-SITE CLUSTERING", also filed on Apr. 30, 2014, each of which is hereby incorporated by reference in its entirety for all purposes.

2.6. Query Processing

Figure 4:
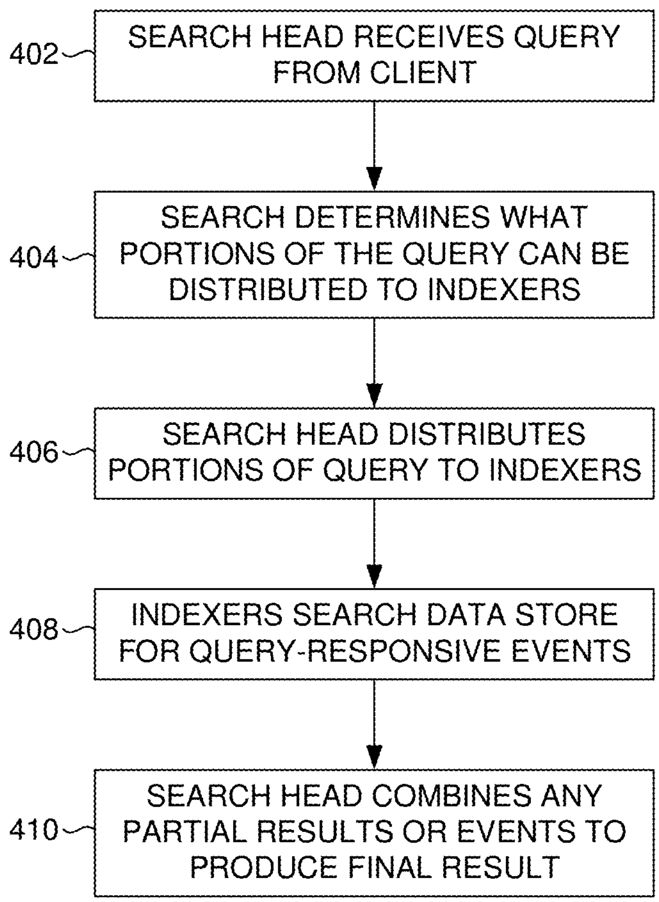
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
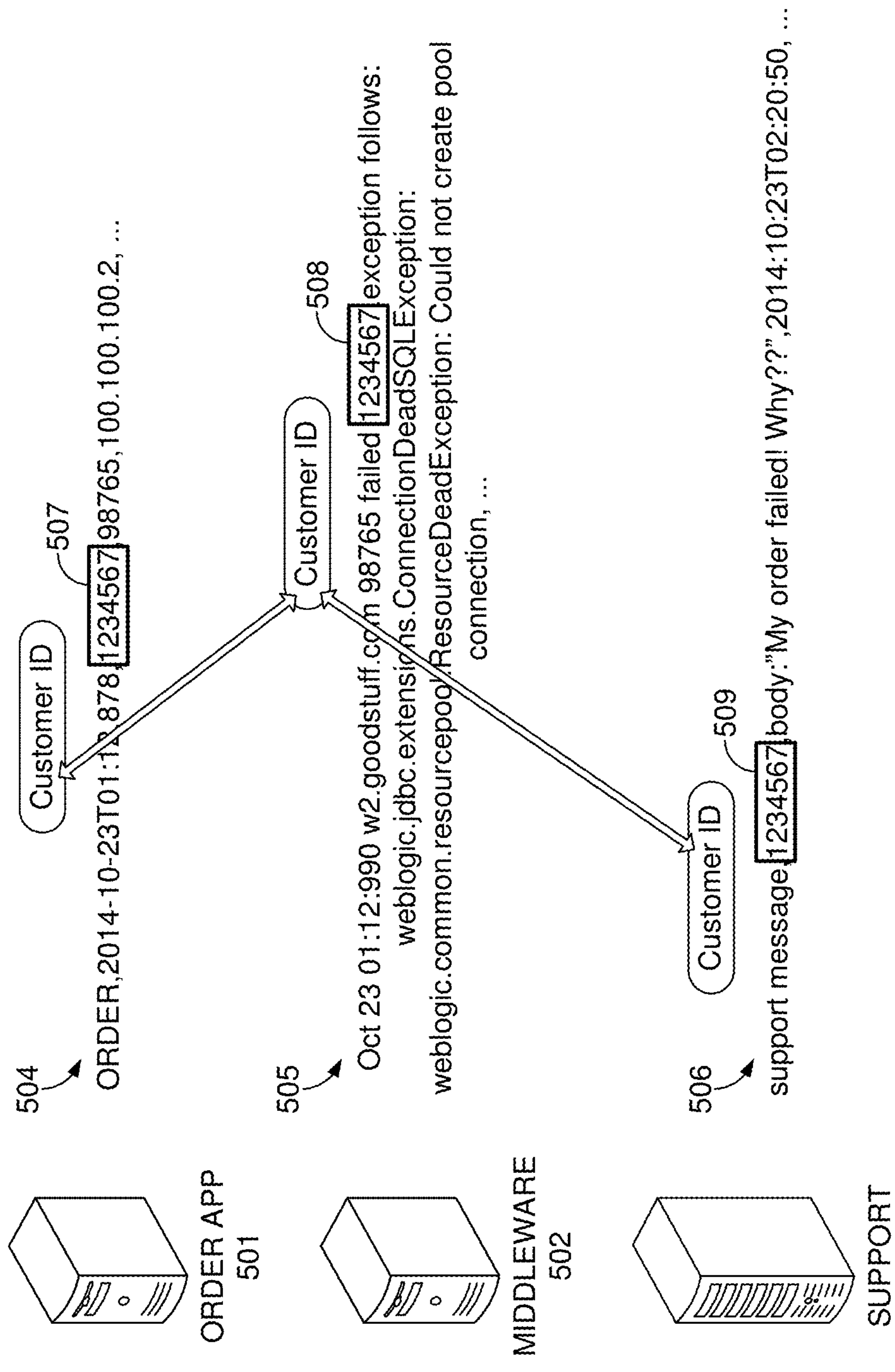
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8.1. Aggregation Technique

To facilitate faster query processing, a query can be structured such that multiple indexers perform the query in parallel, while aggregation of search results from the multiple indexers is performed locally at the search head. For example, FIG. 6 illustrates how a search query 602 received from a client at a search head 210 can split into two phases, including: (1) subtasks 604 (e.g., data retrieval or simple filtering) that may be performed in parallel by indexers 206 for execution, and (2) a search results aggregation operation 606 to be executed by the search head when the results are ultimately collected from the indexers.

During operation, upon receiving search query 602, a search head 210 determines that a portion of the operations involved with the search query may be performed locally by the search head. The search head modifies search query 602 by substituting "stats" (create aggregate statistics over results sets received from the indexers at the search head) with "prestats" (create statistics by the indexer from local results set) to produce search query 604, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.8.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.8.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on Mar. 25, 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on Jan. 31, 2014, and U.S. patent application Ser. No. 14/815,973, entitled "STORAGE MEDIUM AND CONTROL DEVICE", filed on Feb. 21, 2014, each of which is hereby incorporated by reference in its entirety.

2.8.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on Nov. 19, 2013, U.S. Pat. No. 8,412,696, entitled "REAL TIME SEARCHING AND REPORTING", issued on Apr. 2, 2011, and U.S. Pat. Nos. 8,589,375 and 8,589,432, both also entitled "REAL TIME SEARCHING AND REPORTING", both issued on Nov. 19, 2013, each of which is hereby incorporated by reference in its entirety.

2.9. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on Sep. 2, 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on Jul. 31, 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on Jul. 28, 2014, U.S. patent application Ser. No. 14/445,023, entitled "SECURITY THREAT DETECTION OF NEWLY REGISTERED DOMAINS", filed on Jul. 28, 2014, U.S. patent application Ser. No. 14/815,971, entitled "SECURITY THREAT DETECTION USING DOMAIN NAME ACCESSES", filed on Aug. 1, 2015, and U.S. patent application Ser. No. 14/815,972, entitled "SECURITY THREAT DETECTION USING DOMAIN NAME REGISTRATIONS", filed on Aug. 1, 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

2.10. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on Jan. 29, 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

2.11. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one or more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 7:
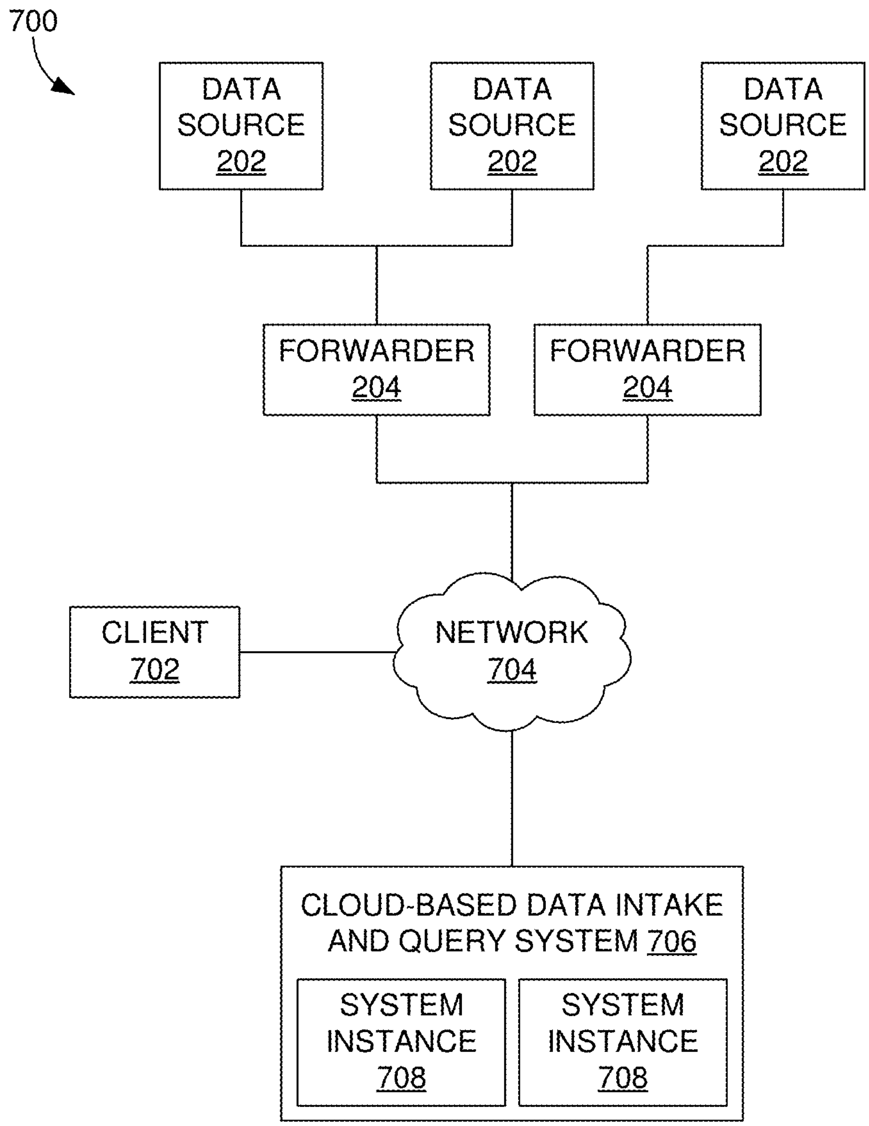
FIG. 7 illustrates a block diagram of an example cloud-based data intake and query system in accordance with the disclosed embodiments.

FIG. 7 illustrates a block diagram of an example cloud-based data intake and query system. Similar to the system of FIG. 2, the networked computer system 700 includes input data sources 202 and forwarders 204. These input data sources and forwarders may be in a subscriber's private computing environment. Alternatively, they might be directly managed by the service provider as part of the cloud service. In the example system 700, one or more forwarders 204 and client devices 702 are coupled to a cloud-based data intake and query system 706 via one or more networks 704. Network 704 broadly represents one or more LANs, WANs, cellular networks, intranetworks, internetworks, etc., using any of wired, wireless, terrestrial microwave, satellite links, etc., and may include the public Internet, and is used by client devices 702 and forwarders 204 to access the system 706. Similar to the system of 108, each of the forwarders 204 may be configured to receive data from an input source and to forward the data to other components of the system 706 for further processing.

In an embodiment, a cloud-based data intake and query system 706 may comprise a plurality of system instances 708. In general, each system instance 708 may include one or more computing resources managed by a provider of the cloud-based system 706 made available to a particular subscriber. The computing resources comprising a system instance 708 may, for example, include one or more servers or other devices configured to implement one or more forwarders, indexers, search heads, and other components of a data intake and query system, similar to system 108. As indicated above, a subscriber may use a web browser or other application of a client device 702 to access a web portal or other interface that enables the subscriber to configure an instance 708.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 708) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD are centrally visible).

2.12. Searching Externally Archived Data

Figure 8:
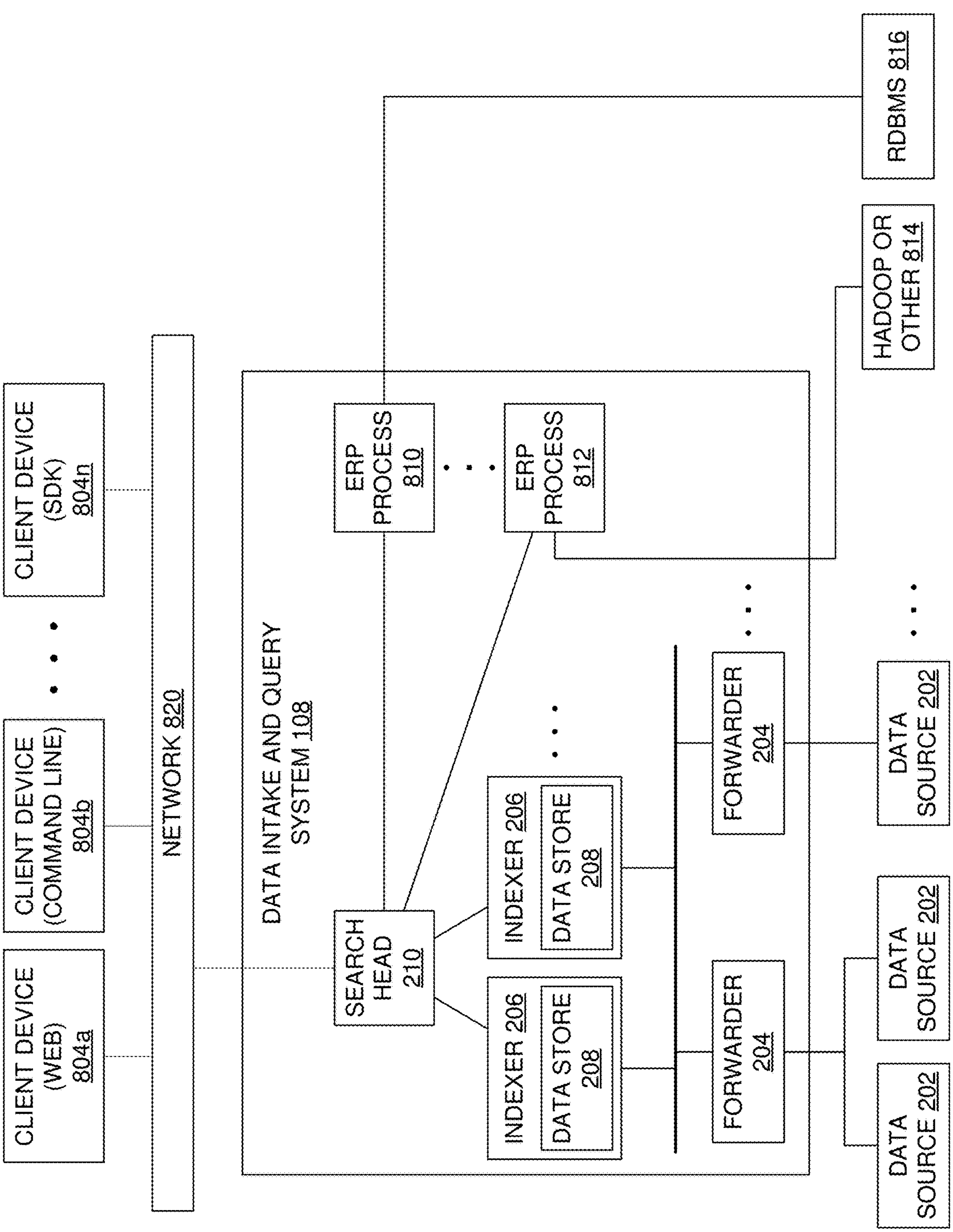
FIG. 8 illustrates a block diagram of an example data intake and query system that performs searches across external data systems in accordance with the disclosed embodiments.

FIG. 8 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 804 over network connections 820. As discussed above, the data intake and query system 108 may reside in an enterprise location, in the cloud, etc. FIG. 8 illustrates that multiple client devices 804*a*, 804*b*, . . . , 804*n* may communicate with the data intake and query system 108. The client devices 804 may communicate with the data intake and query system using a variety of connections. For example, one client device in FIG. 8 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 804 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 810. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 810, 812. FIG. 8 shows two ERP processes 810, 812 that connect to respective remote (external) virtual indices, which are indicated as a Hadoop or another system 814 (e.g., Amazon S3, Amazon EMR, other Hadoop Compatible File Systems (HCFS), etc.) and a relational database management system (RDBMS) 816. Other virtual indices may include other file organizations and protocols, such as Structured Query Language (SQL) and the like. The ellipses between the ERP processes 810, 812 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 810, 812 receive a search request from the search head 210. The search head may optimize the received search request for execution at the respective external virtual index. Alternatively, the ERP process may receive a search request as a result of analysis performed by the search head or by a different system process. The ERP processes 810, 812 can communicate with the search head 210 via conventional input/output routines (e.g., standard in/standard out, etc.). In this way, the ERP process receives the search request from a client device such that the search request may be efficiently executed at the corresponding external virtual index.

The ERP processes 810, 812 may be implemented as a process of the data intake and query system. Each ERP process may be provided by the data intake and query system or may be provided by process or application providers who are independent of the data intake and query system. Each respective ERP process may include an interface application installed at a computer of the external result provider that ensures proper communication between the search support system and the external result provider. The ERP processes 810, 812 generate appropriate search requests in the protocol and syntax of the respective virtual indices 814, 816, each of which corresponds to the search request received by the search head 210. Upon receiving search results from their corresponding virtual indices, the respective ERP process passes the result to the search head 210, which may return or display the results, or a processed set of results based on the returned results to the respective client device.

Client devices 804 may communicate with the data intake and query system 108 through a network interface 820, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on May 27, 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on Jul. 25, 2013, U.S. patent application Ser. No. 14/266,832, entitled "PROCESSING A SYSTEM SEARCH REQUEST ACROSS DISPARATE DATA COLLECTION SYSTEMS", filed on May 1, 2014, and U.S. patent application Ser. No. 14/449,144, entitled "PROCESSING A SYSTEM SEARCH REQUEST INCLUDING EXTERNAL DATA SOURCES", filed on Jul. 31, 2014, each of which is hereby incorporated by reference in its entirety for all purposes.

2.12.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.13. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a system available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

2.14 Cloud-Based Architecture

As shown in the previous figures, various embodiments may refer to a data intake and query system 108 that includes one or more of a search head 210, an indexer 206, and a forwarder 204. In other implementations, data intake and query system 108 may have a different architecture, but may carry out indexing and searching in a way that is indistinguishable or functionally equivalent from the perspective of the end user. For example, data intake and query system 108 may be re-architected to run in a stateless, containerized environment. In some of these embodiments, data intake and query system 108 may be run in a computing cloud provided by a third party, or provided by the operator of the data intake and query system 108. This type of cloud-based data intake and query system may have several benefits, including, but not limited to, lossless data ingestion, more robust disaster recovery, and faster or more efficient processing, searching, and indexing. A cloud-based data intake and query system as described in this section may provide separately scalable storage resources and compute resources, or separately scalable search and index resources. Additionally, the cloud-based data intake and query system may allow for applications to be developed on top of the data intake and query system, to extend or enhance functionality, through a gateway layer or one or more Application Programming Interfaces (APIs), which may provide customizable access control or targeted exposure to the workings of data intake and query system 108.

In some embodiments, a cloud-based data intake and query system may include an intake system. Such an intake system can include, but is not limited to an intake buffer, such as Apache Kafka® or Amazon Kinesis®, or an extensible compute layer, such as Apache Spark™ or Apache Flink®. In some embodiments, the search function and the index function may be separated or containerized, so that search functions and index functions may run or scale independently. In some embodiments, data that is indexed may be stored in buckets, which may be stored in a persistent storage once certain bucket requirements have been met, and retrieved as needed for searching. In some embodiments, the search functions and index functions run in stateless containers, which may be coordinated by an orchestration platform. These containerized search and index functions may retrieve data needed to carry out searching and indexing from the buckets or various other services that may also run in containers, or within other components of the orchestration platform. In this manner, loss of a single container, or even multiple containers, does not result in data loss, because the data can be quickly recovered from the various services or components or the buckets in which the data is persisted.

In some embodiments, the cloud-based data intake and query system may implement tenant-based and user-based access control. In some embodiments, the cloud-based data intake and query system may implement an abstraction layer, through a gateway portal, an API, or some combination thereof, to control or limit access to the functionality of the cloud-based data intake and query system.

3.0 Resource Management

In general, resource management in accordance with disclosed embodiments divides hardware resources into workload pools. In one or more embodiments, the partitioning into workload pools is performed for each virtual or physical computing device of the data intake and query system.

Figure 9:
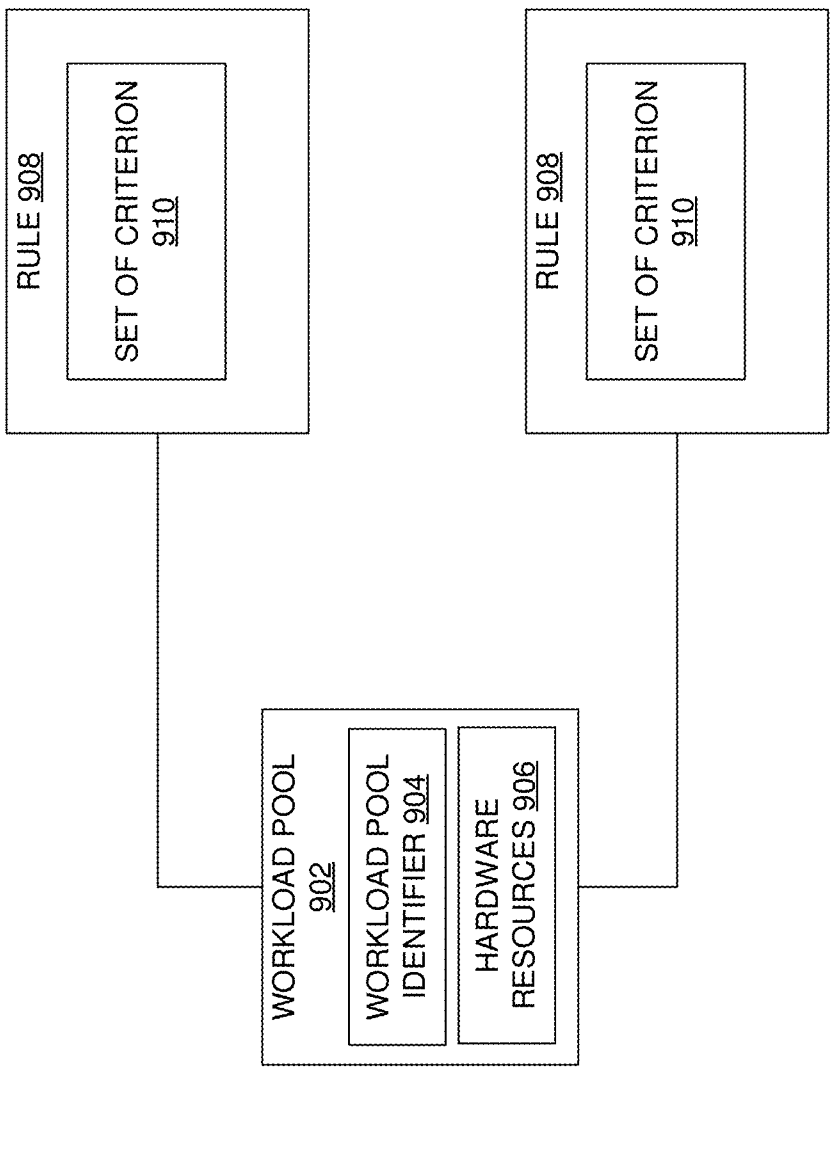
FIG. 9 illustrates a diagram of a workload pool in accordance with one or more embodiments.

FIG. 9 illustrates a diagram of a workload pool in accordance with one or more embodiments. A workload pool is a construct that relates a set of hardware resources to a one or more rules. The one or more rules cause one or more requests to be assigned to the workload pool. In one or more embodiments, the workload pool is a user application level abstraction and support processes to an operating system level resource management layer.

The workload pool includes a workload pool identifier 904 and a set of hardware resources 906. The workload pool identifier is a unique identifier of the workload pool. For example, the workload pool identifier may be an alphanumeric identifier of the workload pool. The workload pool identifier 904 may be assigned by a user, such as a network administrator, or by the computing system. In one or more embodiments, more than one workload pool identifier 904 may be assigned to the same workload pool 902, whereby each workload pool identifier 904 assigned to the workload pool uniquely identifies the workload pool 902. For example, a first workload pool identifier may be a user level identifier, while a second workload pool identifier is an operating system level identifier. For example, the first workload pool identifier may be used for communication between a user and the data intake and query system while the second identifier may be used for communication between the data intake and query system and one or more operating systems.

In one or more embodiments, the hardware resources of the data intake and query system are partitioned into workload pools. A partition is a set of hardware resources 906. Thus, a set of hardware resources 906 is the hardware resources that are assigned to the workload pool 902. A hardware resource may be assigned to a single workload pool at a single time. Unused hardware resources in a workload pool may be used by other workload pools, and then reverted back to the assigned workload pool.

In one or more embodiments, a hardware resource is at least a partition of an underlying hardware device. For example, a hardware resource 906 may be an execution time using the hardware device, or a portion or a share of the hardware device assigned to the workload pool. For example, if the hardware device is a central processing unit (CPU), the hardware resource may be CPU cycles, a number of cores of the CPU, etc. Further, more than one hardware device may be part of a hardware resource. For example, a hardware resource may be a portion of a number of queues. Example hardware resources include input output resources, processing resources, storage resources, memory resources, threads, and other types of resources on the computer. Hardware resources can be used to achieve isolation, prevent over-use as well as prioritization for processes assigned to workload pools.

The hardware resources 906 may be assigned to the workload pool 902 as percentages of the hardware device. By using percentages, the same workload pool 902 definition may be used across multiple computing systems without adjusting for the different amounts of resources on each computing system.

Continuing with FIG. 9, a workload pool 902 is related to one or more rules 908. A rule 908 may be related to a single workload pool 902 in accordance with one or more embodiments. Each rule defines whether the related workload pool should be used for a pending request. A rule 902 includes a set of one or more criteria 910. In some embodiments, rule 908 can be related to a workload pool 902 by the workload pool identifier 904. As such, the rule 908 can include the workload pool identifier. If a pending request satisfies the set of one or more criterion 910 of the rule 908, then the corresponding workload pool 902 is selected is executed to select the pending request. In one or more embodiments, the set of criteria is defined as a predicate. A predicate is a function that takes a set of arguments as input and returns a Boolean. A predicate may include multiple criteria for the workload pool. For example, the arguments may be user identifier, software application, role of the user, type of request (e.g., search or ingest), source type (e.g., for ingest requests), or other aspects of requests and a value for those arguments. Criteria in the predicate may be combined by "and" or "or" statements. By way of an example, a predicate may be that the request is for a specific application or role and has other properties. In one or more embodiments, if the Boolean output of the predicate is true, then the related workload pool is selected.

Figure 10:
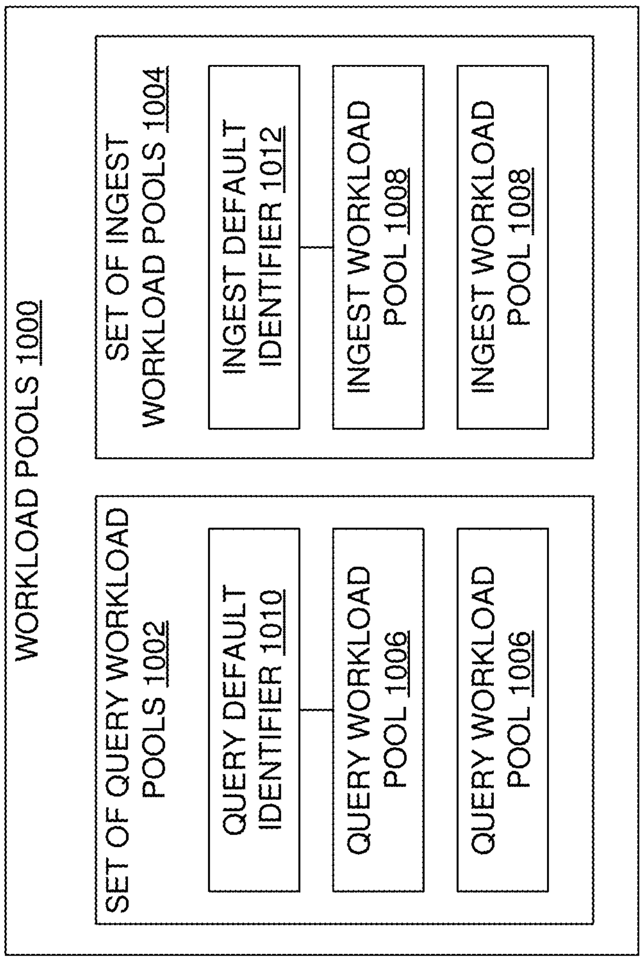
FIG. 10 illustrates a diagram of search and ingest workload pools in accordance with one or more embodiments.

In one or more embodiments, disjoint sets of resources pools may exist for search query requests and for data ingest requests. FIG. 10 illustrates a diagram of search and ingest workload pools in accordance with one or more embodiments. FIG. 10 shows the workload pools 1000 defined for the data intake and query system. As shown in FIG. 10, the workload pools 1000 include a set of query workload pools 1002 and a set of ingest workload pools 1004. In the embodiment shown in FIG. 10, the set of query workload pools 1002 and the set of ingest workload pools 1004 are disjoint in that a workload pool does not exist that is in both sets. In other words, a workload pool is either in the set of query workload pools or in the set of ingest workload pools, but not both.

By having the separation, data ingest requests may have different priorities than search queries. Further, a large number of search queries does not cause starvation of the data ingest requests. For security applications that rely on events being received, stored, and processed in real time, the isolation between the processing of search query requests and data ingest requests means that the amount of resource allocation can be maintained to achieve the real time requirements. Further, the isolation may help to prevent data loss through dropped packets being received and may save network bandwidth.

As shown in FIG. 10, the set of query workload pools 1002 include one or more query workload pools 1006. Likewise, the set of ingest workload pools 1004 include one or more ingest workload pools 1008. Each of the workload pools (e.g., query workload pools 1006, ingest workload pools 1008) may be the workload pool 902 shown in FIG. 9. Specifically, each of the workload pools shown in FIG. 10 may have a set of hardware resources, one or more unique identifiers, and be related to one or more rules. In one or more embodiments, the sets of workload pools (e.g., set of query workload pools 1002, set of ingest workload pools 1004) each include one workload pool related to a default identifier. For example, the set of query workload pools 1002 includes a query workload pool 1006 that is related to a query default identifier 1010, and the set of ingest workload pools 1004 includes an ingest workload pool 1008 that is related to an ingest workload pool identifier 1012. The default workload pool identifier specifies that the related workload pool is to be used as a default workload pool when a request does not match any other workload pool in the corresponding set. As such, in various embodiments, if the rules related to the various workload pools are exhausted without a workload pool being selected, then the default workload pool is used.

Figure 11:
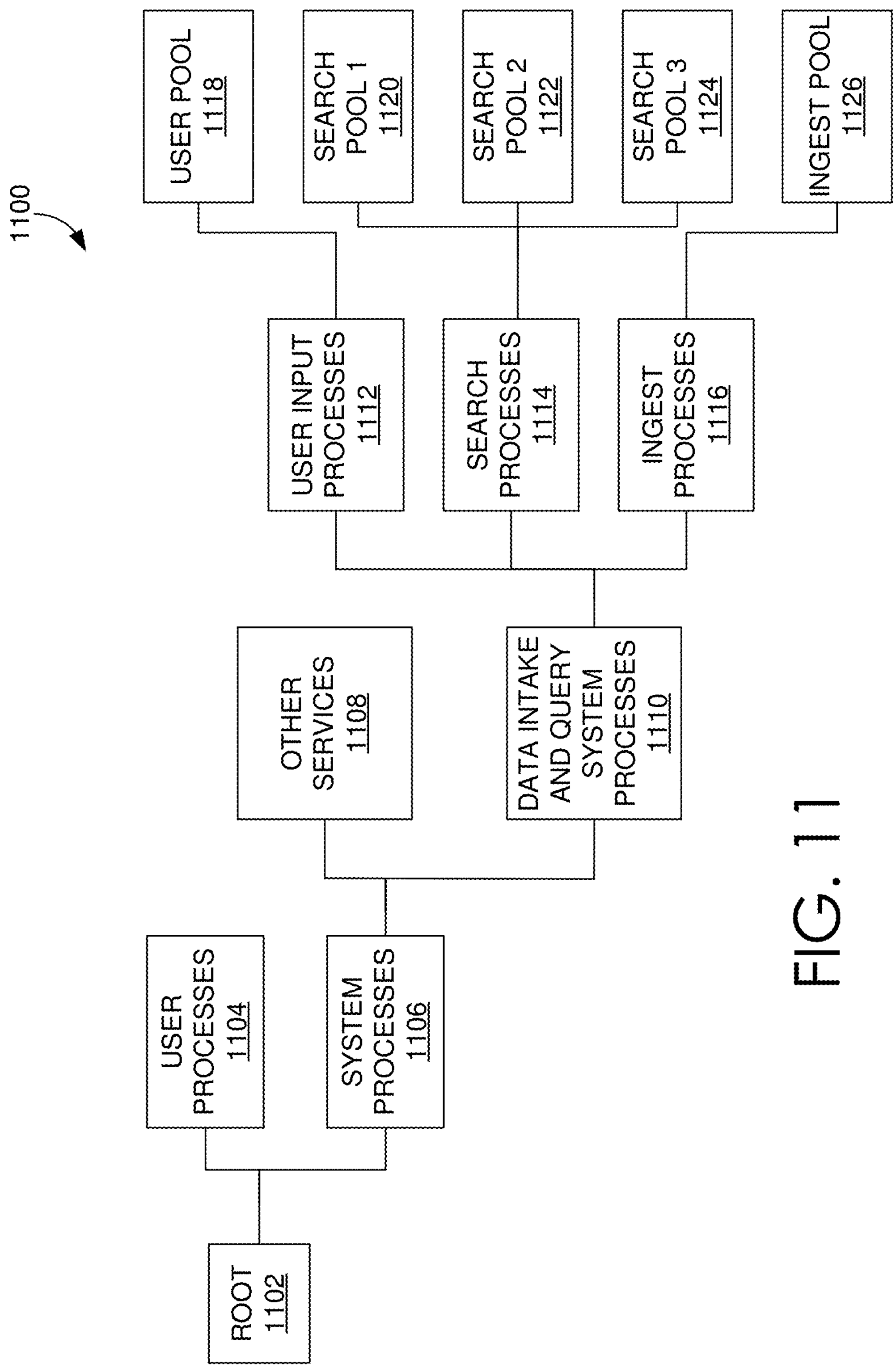
FIG. 11 illustrates a diagram of a workload pool hierarchy in accordance with disclosed embodiments.

In one or more embodiments, workload pools are defined hierarchically. FIG. 11 illustrates a diagram of a workload pool hierarchy 1100 in accordance with disclosed embodiments. As shown in FIG. 11, the root 1102 processes are allocated the hardware resources of the system. The hardware resources may be partitioned into workload pools for user processes 1104 and for system processes 1108. System processes 1108 can include the different services of the computing system. The workload pool for system processes 1106 may include one or more workload pools for other services 1108 and a workload pool for the data intake and query system 1110. Other services 1108 can include any of the other services, other than the data intake and query processes, executing on the computing system used to implement the data intake and query system.

The workload pool for the data intake and query system may further be partitioned into workload pools for user input processes 1112, search processes 1114, and ingest processes 1118. The user input processes 1112 are the processes to monitor and manage the data intake and query system. For example, the user input processes may be the processes that support the client application and respond to monitoring requests. The workload pools allocated to the user input processes 1112 may include a user pool 1118 for the user processes.

The search processes 1114 are the set of search workload pools. Set of search workload pools include search pool 1 1120, search pool 2 1122, and search pool 3 1124. In the example, through the respective rules, search pool 1 1120, search pool 2 1122, and search pool 3 1124 may each correspond to different priority levels. For example, search pool 1 1120 may be a workload pool for high priority search queries as designated by an example rule. Search pool 2 1122 may be a workload pool for medium priority search requests, and search pool 3 1124 may be a workload pool for low priority search requests as designated by respective example rules. Other configurations and designations by rules may exist without departing from the scope of the claims.

The ingest processes 1116 includes a set of workload pools that has a single ingest pool 1126. The single ingest pool 1126 as the hardware resources of the ingest processes 1116 workload pool.

In the hierarchy, a child workload pool may have all or a subset of the hardware resources of the parent workload pool. Sibling workload pools (i.e., workload pools that child workload pools of the same parent) are allocated non-overlapping sets of hardware resources. In particular, the underlying hardware device is temporarily and/or spatially non-overlapping. Workload pools that are in the same path to the root workload pool may share a hardware resource. Workload pools that are in different paths to the parent do not share the same hardware resource.

The hierarchy shown in FIG. 11 is only an example. For example, the user input processes pool 1112 may have separate workload pools for monitoring the data intake and query system, managing the data intake and query system, and performing other actions. Search pool 1 1120 may have one or more child workload pools. For example, high priority workload pools may further be divided into critical workload pools and important workload pools. As another example, the ingest processes 1116 workload pools may be further partitioned into multiple ingest workload pools.

From a backend perspective, the hierarchical definition of workload pools may match the control group (i.e., Cgroup) allocation of the LINUX® kernel. LINUX® is a registered trademark owned by Linus Torvalds. CGroups are kernel level allocation of resources that is supported by a virtual filesystem. In the filesystem, containment within the folder represents a parent child relationship in a file system hierarchy. Each folder is a Cgroup. The Cgroup hierarchy may be defined by creating, removing, and renaming subdirectories within the Cgroup virtual filesystem.

The data search and query system uses resource groups to interface with users and perform application level processing to select and assign requests to corresponding resource groups. To enforce the resource allocation, the data intake and query system may use operating system processes that enforce according to Cgroups. In other words, each Cgroup has a matching workload pool. Once the workload pool is selected and assigned to the request, the data intake and query system assigns the processes used to process the request to the particular Cgroup matching the assigned workload pool.

Figure 12:
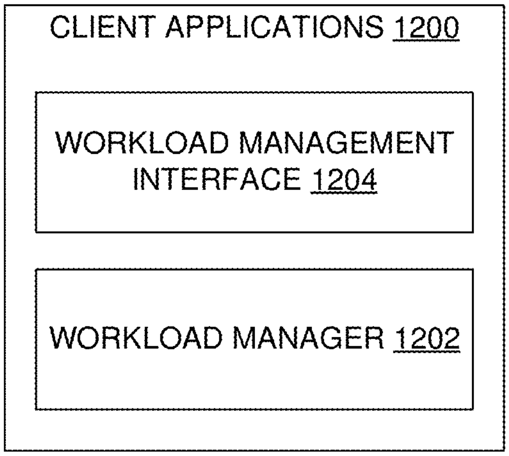
FIG. 12 illustrates a component diagram of a client application in accordance with disclosed embodiments.

Workload pools may be defined in a client application 1200. FIG. 12 illustrates a component diagram of a client application 1200 in accordance with disclosed embodiments. The client application 1200 may be the same as the client application 110 described above with reference to FIG. 1. In such a scenario, the client application 1200 may further include a monitoring component. As another example, the client application 1200 may be a separate software application in the data intake and query system. For example, the client application 1200 may be a web application located on a web server in the data intake and query system. The web server may be located on the same computing system as any of the components of the data intake and query system or located on a separate computing system. As another example, the client application may be a local application configured to execute on a user's device. The client application is communicatively connected to one or more of the components of the data intake and query system. For example, the client application may be connected to the search head, the indexers, the forwarders, and other components.

As shown in FIG. 12, the client application includes a workload manager 1202 and a workload management interface 1204. The workload manager 1204 is software, hardware, and/or firmware that is configured to propagate workload management changes, such as the workload pool definitions and rule definitions, throughout the data intake and query system. For example, the workload manager may be configured to communicate with the search head to update the search head with workload changes. The workload manager 1204 may further be configured to monitor the output of the data intake and query system.

Figure 13:
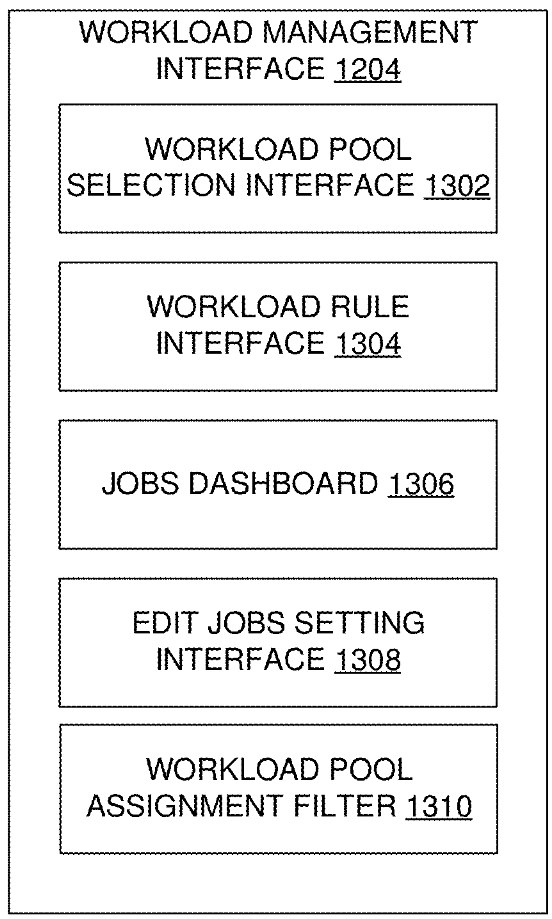
FIG. 13 illustrates a diagram of a workload management interface in accordance with disclosed embodiments.

The workload management interface 1204 is a user interface to receive workload management changes from a user and present output to the user. The workload management interface may be a command line interface, a graphical user interface, or other interface, such as an application program interface (API). The workload management interface 1204 and corresponding components may be presented. Presenting includes transmitting to a user device and/or displaying. Other methods for presenting are also included herein. FIG. 13 illustrates a diagram of a workload management interface 1204 in accordance with disclosed embodiments.

As shown in FIG. 13, the workload management interface 1204 includes a workload pool selection interface 1302, a workload rule interface 1304, a jobs dashboard 1306, an edit jobs setting interface 1308, and a workload pool assignment filter 1310. Each of these interfaces are described below.

The workload pool selection interface 1302 is an interface configured to receive a selection of a plurality of hardware resources for the workload pool. The workload pool selection interface 1302 may be used for the creation of a new workload pool or an updating of an existing workload pool. For example, when the workload pool selection interface is presented, the workload pool selection interface may include a list of possible types of hardware resources. The types of hardware resources may be individual hardware devices or groups of hardware devices. For each type, the workload pool selection interface may include a user interface widget to receive an amount of the type as the hardware resource. For example, the workload pool selection interface 1302 may be configured to receive a percentile allocation of the hardware devices. The percentile allocation may be specified as a number between and including zero and one hundred, a percentage, or a decimal. The workload pool selection interface 1302 may further be configured to confirm that the value entered matches the data type required for the hardware resource and satisfies a predefined range. An example of a workload pool selection interface is described below in reference to FIG. 29.

The workload rule interface 1304 is configured to receive criteria for a new workload rule or to edit an existing workload rule. For example, the workload rule interface may include a list of arguments and format for the arguments for a predicate. The workload rule interface may further specify the priority order for checking the rule. As described above, rules may be processed in a particular order. The workload rule interface allows a user to specify the position of the workload rule in the order. Further, the workload rule interface 1304 may be configured to receive a selection of a workload pool. An example of a workload rule interface is described below in reference to FIG. 30.

The jobs dashboard 1304 is an interface that is configured to present a set of jobs pending in the data intake and query system. A job is a processing of a data ingest request or a search query request. The jobs dashboard 1304 may present properties and status information about the job. The jobs dashboard 1304 may include a workload pool assignment filter 1310. When selected, the workload pool assignment filter 1310 is configured to display jobs in a workload pool specified to the filter. An example of a jobs dashboard is described below in reference to FIG. 30.

The edit jobs setting interface 1308 is an interface to move a job from a workload pool to another workload pool. The edit jobs setting interface may further include access information for accessing the job. An example of an edit jobs setting interface is described below in reference to FIG. 32.

Figure 14:
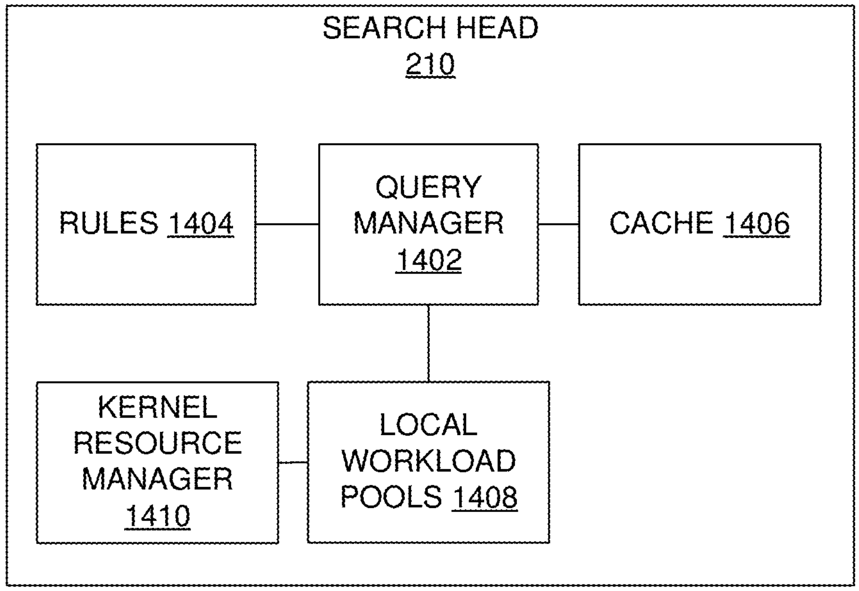
FIG. 14 illustrates a diagram of a search head in accordance with disclosed embodiments.

Continuing with the discussion of the data intake and query system, FIG. 14 illustrates a diagram of a search head in accordance with disclosed embodiments. In one or more embodiments, the search head 210 is configured to receive incoming search queries and process the incoming search queries to assign the search queries to workload pools. The assignment by the search head 210 propagates throughout the data intake and query system. As shown in FIG. 14, the search head 210 includes a query manager 1402, a set of rules 1404, a cache 1406, local workload pools 1408, and a kernel resource manager 1410. The set of rules 1404 correspond to the rules described above with reference to FIG. 9. The cache 1406 is a process cache to quickly initiate new search queries. The cache 1406 is described below with reference to FIG. 26.

The query manager 1402 is hardware, software, and/or firmware that is configured to manage search queries. Managing search queries includes gathering configurations for the search queries, applying the rules to select a workload pool, performing policy based enforcement of the execution of the search query in the workload pool, and modifying the execution of the search query, such as by changing the workload pool.

The local workload pools 1408 are the workload pools on the search head for the search head to process queries. Specifically, each component and/or replica of the data intake and query system may have a local copy of the workload pools. The local copy is referred to as the local workload pools (e.g., local workload pools 1408) The component uses the local copy to process requests. In other words, enforcement of the requests in workload pools is performed independently and locally by the components of the data intake and query system in one or more embodiments.

A kernel resource manager 1410 is one or more operating system processes configured to schedule the execution of the search query locally and enforce the assignment to the workload pools. In one or more embodiments, the kernel resource manager performs local process level enforcement of workload pools. The kernel resource manager may operate for example using Cgroups or other operating system level allocation of hardware resources.

Figure 15:
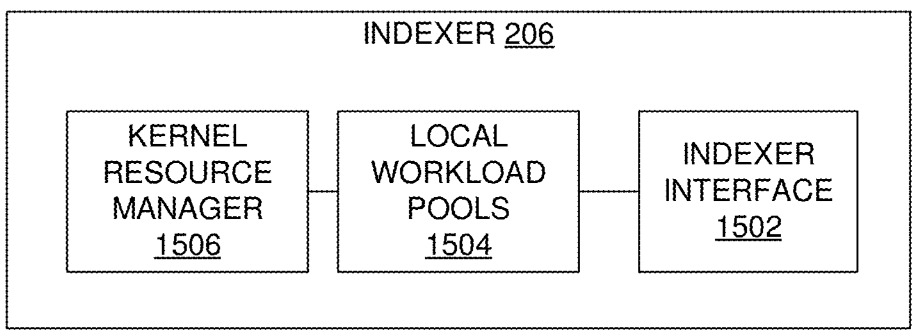
FIG. 15 illustrates a diagram of an indexer in accordance with disclosed embodiments.

FIG. 15 illustrates a diagram of an indexer 206 in accordance with disclosed embodiments. As shown, the indexer 206 includes an indexer interface 1502, local workload pools 1504, and kernel resource manager 1506. The indexer interface 1502 is an interface for the indexer 206 communicatively connect to the search head. The indexer interface is configured to receive search queries from the search head and receive updates to the workload pools. The local workload pools 1504 and the kernel resource manager 1506 are the same or similar to the local workload pools 1408 and the kernel resource manager 1410 as described above with reference to FIG. 14.

Figure 16:
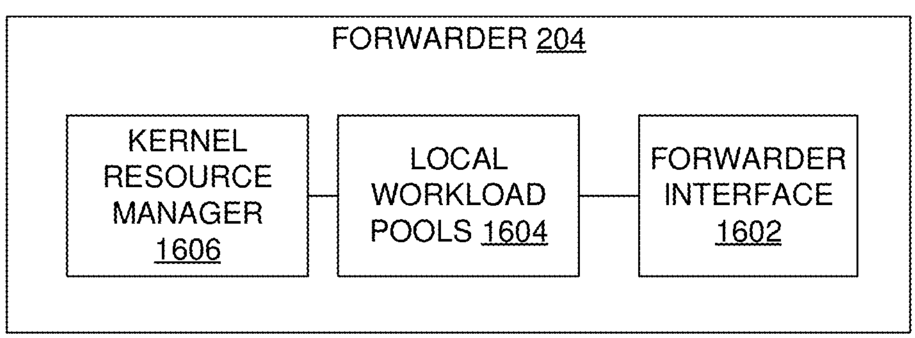
FIG. 16 illustrates a diagram of a forwarder in accordance with disclosed embodiments.

FIG. 16 illustrates a diagram of a forwarder 204 in accordance with disclosed embodiments. As shown, the forwarder 204 includes a forwarder interface 1602, local workload pools 1604, and kernel resource manager 1606. The forwarder interface 1602 is an interface for the forwarder 204 to communicatively connect to other devices in the data intake and query system. For example, the forwarder interface 1602 may be configured to connect to a component (e.g., separate server, webserver, search head, etc.) that receives initial ingest requests. The forwarder interface 1602 may be configured to receive an assignment of a data ingest request to a workload pool and receive updates to the workload pools. As another example, for data ingest requests, the forwarder may include similar components and include similar functionality as the search head uses to process search query requests. The local workload pools 1604 and the kernel resource manager 1606 are the same or similar to the local workload pools 1408 and the kernel resource manager 1410 as described above with reference to FIG. 14.

In FIGS. 14, 15, and 16, the kernel resource manager is shown as being part of the search head, indexer, and forwarder, respectively. The kernel resource manager may be considered part of the search head, indexer, and forwarder when the search head, indexer, and forwarder are individual virtual and/or physical devices. In one or more embodiments, one or more of the search head, indexer, and forwarder may be an application that uses operating system processes. From an application perspective, the kernel resource manager is not a part of the search head, indexer, and forwarder applications, but rather communicates with and supports the respective applications in one or more embodiments. Further, if two or more of the search head, indexer, and forwarder execute on the same device, the respective kernel resource manager may be the same set of processes.

The search head 210, indexer 206, and forwarder 204 may have additional components not shown in FIGS. 14, 15, and 16. In particular, the components shown are for workload management. The other components are omitted for the purposes of simplifying the description.

When a configuration is added (e.g., through starting workload management), or a configuration change is performed using the workload management interface (e.g., by adding/modifying/deleting rules/workload pools), the configuration or change thereof is propagated to the indexers, search head and forwarders. For example, for the indexers, the changes are propagated via bundle push to the indexers. On the search head(s), the changes may be propagated via the deployer or by using conf replication. When changes are received, the changes are replicated and trigger an implicit reload. The in-memory state of the system changes and future requests will use the new workload management configuration that has been dispatched without requiring any system restarts or causing interruption. Each of the indexers, search head and forwarders updates the configuration locally. Requests that are affected by such changes are reassigned according to the current rules (e.g., changed/new rules) and the reassignment is propagated as described below with reference to FIG. 22. The reassignment is performed on the search head for distributed searches and on indexers for local searches only in one or more embodiments.

Figure 17:
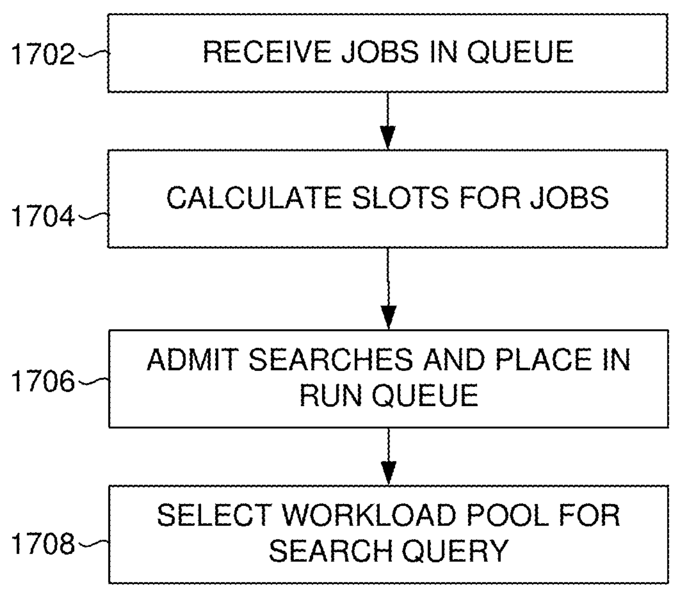
FIG. 17 illustrates a diagram of a processing jobs by a search head in accordance with disclosed embodiments.

FIG. 17 illustrates a diagram of a processing jobs by a search head in accordance with disclosed embodiments. Specifically, FIG. 17 illustrates a general method for a search head to process jobs. At Block 1702, jobs are received in a queue. In one or more embodiments, clients, such as systems that analyze search queries, user level applications, and other types of clients send search queries to data intake and query system. When the search queries are received, the search queries are placed in a job queue.

At Block 1704, slots for the jobs are calculated. An amount of resources are determined based on the job request. At Block 1706, the searches are admitted and placed in the run queue. Search queries are executed from the run queue. At Block 1708, a workload pool is selected for the search query. For each search query in the run queue, the search head determines the workload pool to process the search request. Based on the workload pool, the search head processes the search request.

Figure 18:
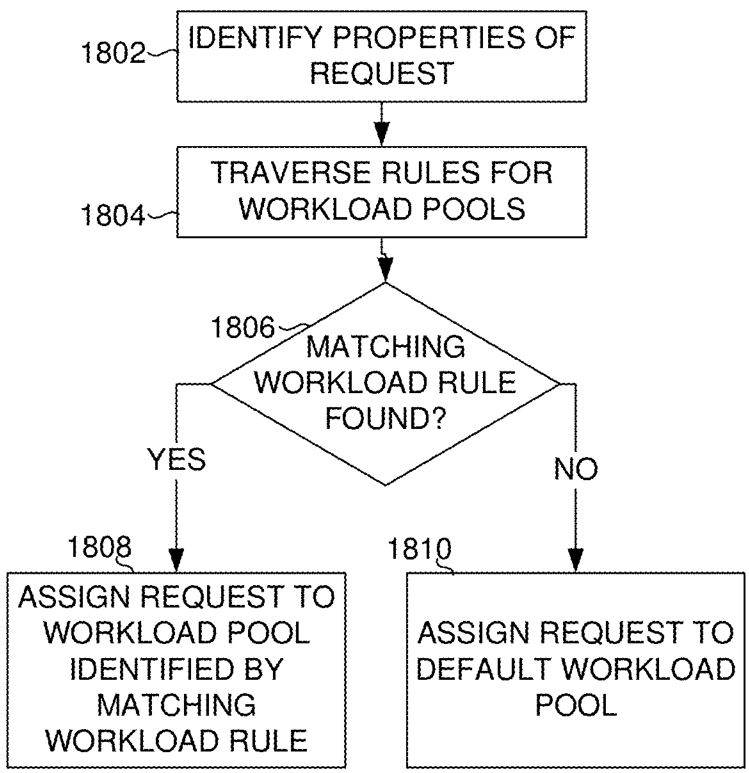
FIG. 18 illustrates a flowchart of selecting a workload pool in accordance with disclosed embodiments.

FIG. 18 illustrates a flowchart of selecting a workload pool in accordance with disclosed embodiments. A request is received from an intake queue. The request may be a search query request or a data intake request. At Block 1802, the properties of the request are identified. The properties include the attributes of the request that correspond to the arguments in the predicates associated with each rule. For example, the properties may include the source application of the request, a user identifier associated with the request, a role of the user, the type of request, and other properties. The properties may be extracted from metadata associated with the request and/or by searching second data store for additional information. For example, by performing a lookup, the role of the user may be identified based on the user identifier.

Continuing with FIG. 18, at Block 1804, the rules for the workload pools are traversed. In one or more embodiments, the rules are traversed in the order specified by the rules. For each rule, a determination is made whether the properties of the request, when used in the arguments to the rule, satisfy the rule indicating that the corresponding workload pool should be selected. As soon as a rule is satisfied for the request, the system stops and assigns the corresponding workload pool to the request. In other words, the system does not continue to process the search.

For hierarchical arrangement of workload pools, the rules may also be hierarchically arranged. In such a scenario, at each level of the hierarchy, a determination may be made as to which child path to take based on which child path has a matching rule. As soon as a rule is satisfied for finding a matching child, the system stops checking rules through the current child workload pools. Rather, the system traverses to the matching child workload pool. The matching child resource group becomes the current workload pool, and the system proceeds to process, in order, rules defined for the child workload pools of the current workload pool. As the rules for the child workload pools are processed, the system attempts to find a matching child workload pool. The flow repeats along the hierarchy until no matching workload pool is found or until the matching child workload pool is a leaf workload pool.

At Block 1806, a determination is made whether a matching workload rule is found. If a matching workload rule is found, then the request is assigned to the workload pool identified by the workload rule at Block 1808. If a matching workload pool is not found, then the request is assigned to a default workload pool at Block 1810. Assigning the request to a selected workload pool includes relating the workload pool identifier to the request. The workload pool identifier related to the request may be the user level identifier. Individual processes process the request are also related to the workload pool identifier. The workload pool identifier related to the individual processes may be an operating system level identifier. In general, in response to a request, the data intake and query system spawns various processes to process the request. For example, in the case of a data ingest, kvstore, introspection, web_server, fsck, optimize, process_runner, and other processes may be created. In the case of search query, a search process and a search process runner may be created. In the case of user inputs, modular and scripted processes are created. Returning to associating the resource group identifier, the operating system level identifier of the resource group is associated with the identifier of the process. For Cgroups, the operating system level identifier that is related to the individual processes is the path, in the virtual file system, to the Cgroup corresponding to the workload pool. More detail regarding processing the request and associating processes with the request when the request is a search query is described below in reference to FIG. 19.

Figure 19:
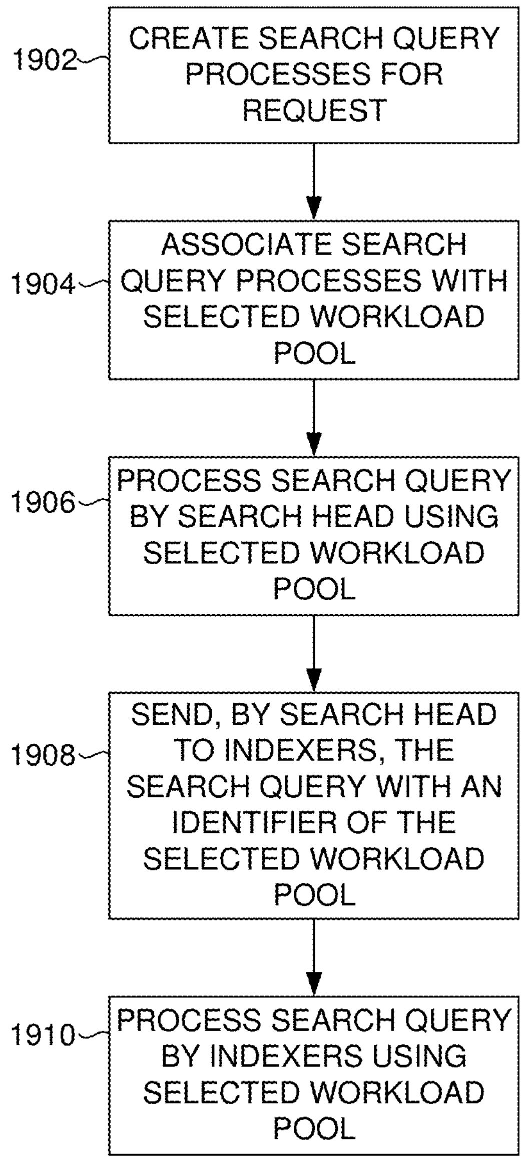
FIG. 19 illustrates a flowchart of processing a search query request using workload management in accordance with disclosed embodiments.

FIG. 19 illustrates a flowchart of processing a search query request using workload management in accordance with disclosed embodiments. When a search query request is received by the search head, the search head determines that the request is a search query. At Block 1902, the search head creates search query processes for the request. As described below, obtaining the search query processes may be performed by obtaining the configurations for the search query from storage. Search processes are created based on the configurations. The search query processes are related to the search query in storage. Thus, by identifying the search query request, the search query processes may be identified. In some embodiments, a cache may be used. Using the cache is described below with reference to FIGS. 26 and 27.

Continuing with FIG. 19, at Block 1904, the search query processes are associated with the selected workload pool. Associating the search query processes with the selected workload pool is discussed above with reference to FIG. 18.

At Block 1906, the search head processes the search query using the selected workload pool in accordance with one or more embodiments. In other words, not only is the processing on the indexers performed using the selected workload pool, the processing on the search head is performed using the selected workload pool. The kernel resource manager enforces the execution of the search query using the selected workload pool.

At Block 1908, the search head sends, to the indexer(s), the search query with an identifier of the selected workload pool. The selected workload pool identifier is in an argument in the command to the indexer to search the corresponding data store. The indexer extracts the argument and assigns processes created on the indexer for processing the search request to the selected workload pool according to the identifier. The selected workload pool on the indexer is in the local workload pool. Assigning the processes to the selected workload pool may be performed as discussed above. At Block 1910, the search query is processed by the indexers using the selected workload pool. A kernel resource manager on the indexer enforces the resource constraints created by the workload pool. Specifically, the kernel resource manager ensures that that the search query is executed using hardware resource allocated to the workload pool.

Figure 20:
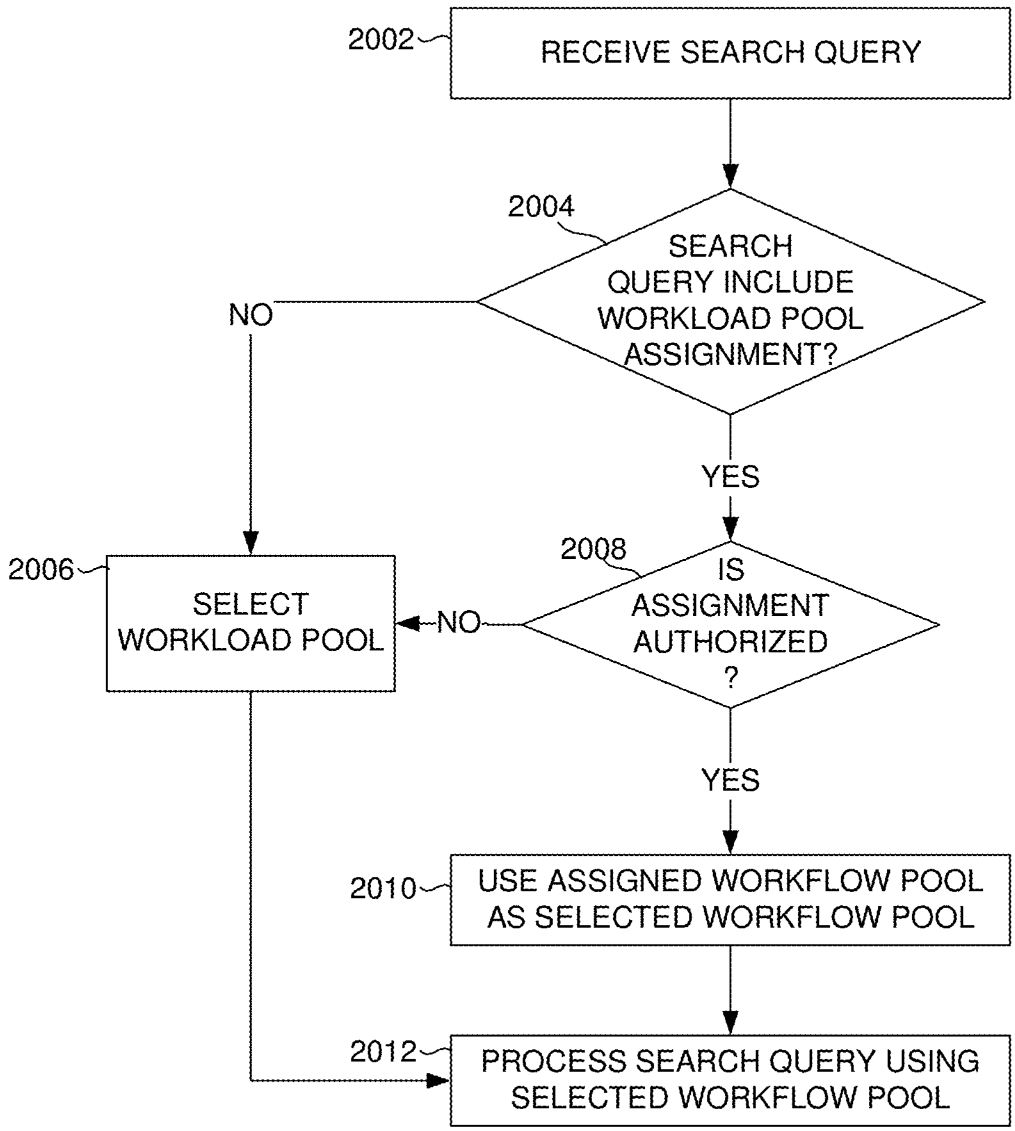
FIG. 20 illustrates a flowchart of assigning a workload pool to a search query in accordance with disclosed embodiments.

FIG. 20 illustrates a flowchart of assigning a workload pool to a search query in accordance with disclosed embodiments. At Block 2002, a search query is received. Specifically, the search query is received by the search head. In some embodiments, the search query, when received by the search head, includes an assignment of the workload pool. In other words, a pipeline command of the search query may include an argument having a workload pool identifier. The assignment may be performed using any of various search interfaces, such as dashboards, report accelerations, data model accelerations, sub-searches, etc.

Accordingly, at Block 2004, a determination is made whether the search query includes the workload pool assignment. If the search query does not include the workload pool identifier, then the flow proceeds to Block 2006 to select the workload pool in accordance with one or more embodiments. Selecting the workload pool may be performed as discussed above with reference to FIG. 18. If the search query does include the workload pool identifier, the flow proceeds to Block 2008.

At Block 2008, a determination is made whether the assignment is authorized. Various attributes may be extracted from the search query, such as user role, user identifier, application type, etc. The workload pool or the workload management system as a whole may be associated with parameters limiting the search queries that may include an assignment of a workload pool based on the attributes of the search query. Thus, by comparing the attributes parameters, a determination may be made whether the assignment is authorized. If the assignment is not authorized, then the flow proceeds to Block 2006 to select the workload pool in accordance with one or more embodiments. If the assignment is authorized, the flow proceeds to Block 2010.

At Block 2010, the assigned workload pool is used as the selected workload pool in accordance with one or more embodiments. Assigning the workload pool may be performed as discussed above with reference to FIG. 18. At Block 2012, the search query is processed using the selected workload pool. Processing the search query may be performed as discussed above with reference to FIG. 19.

Figure 21:
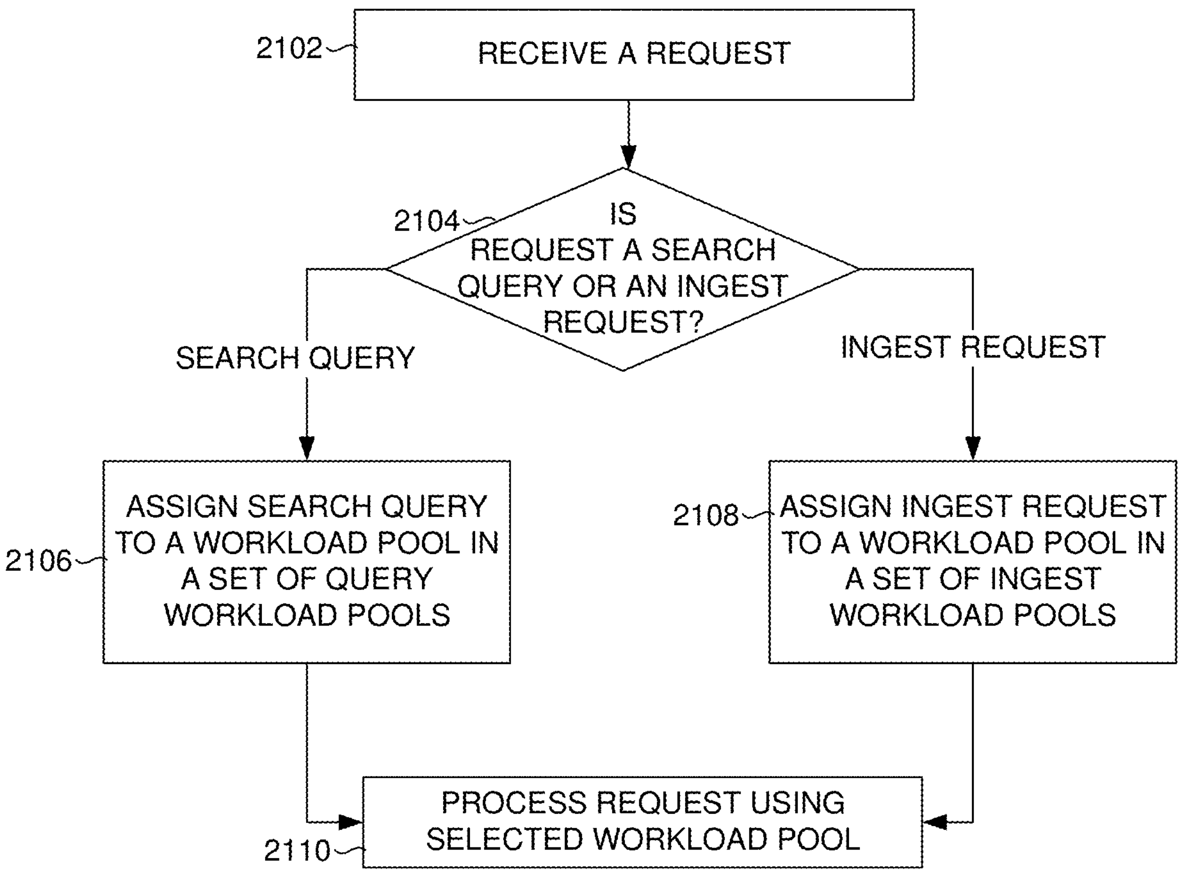
FIG. 21 illustrates a flowchart of selecting a workload pool in accordance with disclosed embodiments.

FIG. 21 illustrates a flowchart of selecting a workload pool in accordance with disclosed embodiments. Specifically, FIG. 21 is directed to using different allocations for search queries as for data ingest. At Block 2102, a request is received. For example, the request may be a search query request associated with at least one data store, or an ingest request associated with at least one data store. Associated with means that the request involves the storage and/or retrieval of data from one or more of the data stores. The request may or may not explicitly identify the respective data stores to retrieve or store the respective data.

A determination whether the request is a search query request or an ingest request at Block 2104. The determination is made by parsing the request and obtaining the attributes of the request. If the request is a search query request, at Block 2106, the search query is assigned to a workload pool in a set of query workload pools. Specifically, the rules for the search query workload pools are processed in order to select a search query workload pool as the selected workload pool. Selecting the workload pool from the set of query workload pools may be performed as discussed above in reference to FIG. 18.

If the request is a ingest request, at Block 2108, the ingest request is assigned to a workload pool in a set of ingest workload pools. The rules for the ingest workload pools are processed in order to select an index workload pool as the selected workload pool. Selecting the workload pool from the set of ingest workload pools may be performed as discussed above in reference to FIG. 18. The ingest request may be assigned to the workload pool as soon as workload management is enabled, so that any data for ingest may run in a sandboxed environment with a set of resources. The user-input based assignment (e.g., for modular or scripted inputs) may be performed based on incoming ingest requests or for the next scheduled run. For example, if a single ingest workload pool in the set of ingest workload pools exists, then any data received for ingest is automatically processed using the single ingest workload pool. As such the assignment in Block 2108 may be performed prior to receiving the ingest request.

Regardless whether the request is a search query request or an ingest request, the flow proceeds to Block 2110. At Block 2110, the request is processed using the selected workload pool.

Figure 22:
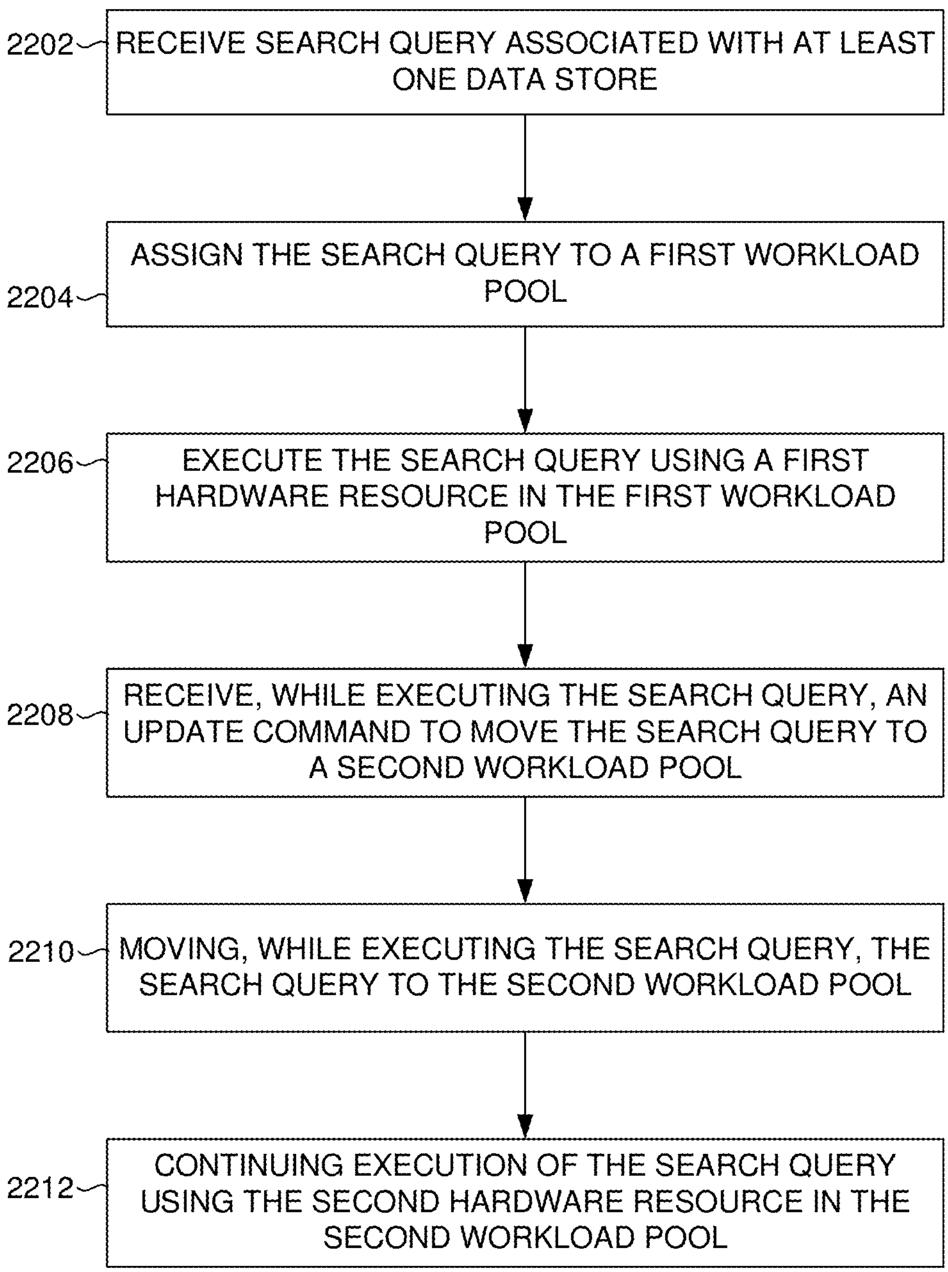
FIG. 22 illustrates a flowchart to move, while executing, a search query between workload pools in accordance with disclosed embodiments.

FIG. 22 illustrates a flowchart to move, while executing, a search query between workload pools in accordance with disclosed embodiments. While processing the search query, embodiments allow for the search query to be moved from one workload pool to another workload pool without interruption. Specifically, even though the search query may be performed across multiple devices, the movement of the search query may be performed across the multiple devices without interrupting execution.

At Block 2202, the search query to search the data store is received. As described above, the search query is assigned to a selected workload pool at Block 2204. Receiving the search query and assigning the search query to the workload pool may be performed as discussed above with reference to FIG. 18. At Block 2206, the search query is executed using a first hardware resource in the first workload pool. Executing the search query may be performed as described above with reference to FIG. 19. Specifically, the kernel resource manager allocates hardware resources assigned to the workload pool to the search query.

While executing the search query, at Block 2208, an update command is received to move the search query to another workload pool. The update command may be received from a user, the client application, another application, or may be policy based.

Accordingly, while executing the search query, the search query is moved to the second workload pool at Block 2210. The search head determines whether the move is valid, identifies the processes corresponding to the search query, and sends an operating system command to move the processes to the new workload pool. The search head also sends a command to the indexers to move the search query. The indexers identify the processes for the search query and issues a move command to move the search query locally on the indexers to the new workload pool. Moving the search query may be performed as discussed below with reference to FIGS. 23 and 24.

At Block 2212, execution of the search query continues using a second hardware resource the second workload pool. After the search query is moved, during the next time period in which the processes of the search query is executed, the kernel resource manager schedules execution using the second hardware resource that is allocated to the second workload pool. The first hardware resource is no longer used to process the search query unless the first hardware resource is an excess resource of the first workload pool.

Figure 23:
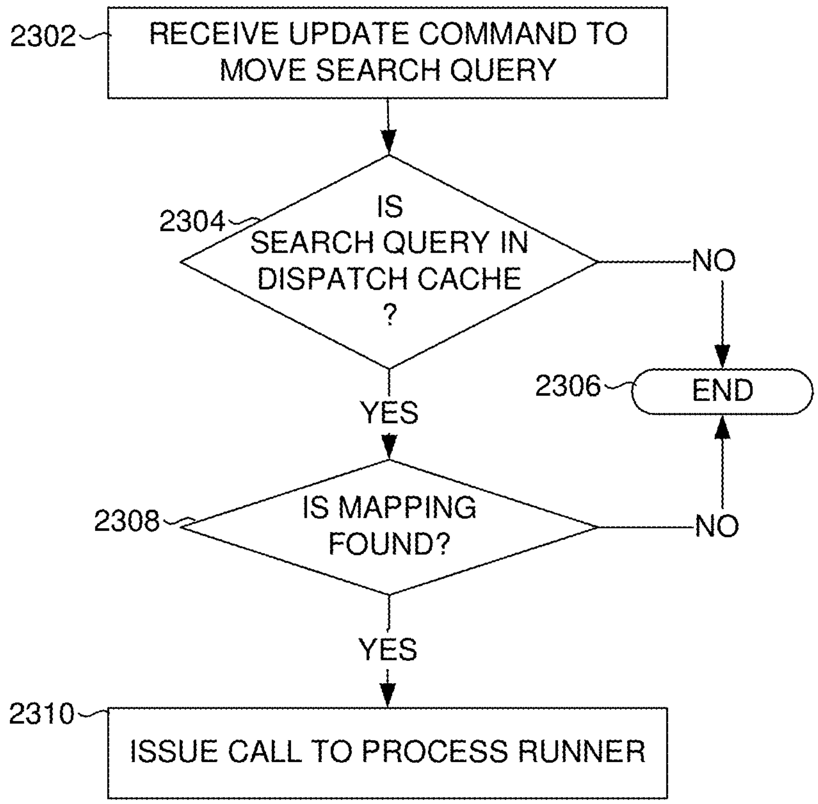
FIG. 23 illustrates a flowchart for a search head to move a search query between workload pools in accordance with disclosed embodiments.

FIG. 23 illustrates a flowchart for a search head to move a search query between workload pools in accordance with disclosed embodiments. At Block 2302, an update command is received to move the search query. In one or more embodiments, a request handler on the search head receives the request. A determination is made whether the search query is in the dispatch cache at Block 2304. The dispatch cache maintains the set of search queries that have been dispatched and are being executed. Thus, if a determination is made that the search query is not in the dispatch cache, then the flow proceeds to end 2306. If the search query is in the dispatch cache, the flow proceeds to Block 2308 where a determination is made whether a mapping is found. Specifically, a determination is made whether the search query maps to a process runner. As described above, one of the processes spawned in response to receiving the search query is a process runner that manages execution of the search query across the indexers. Accordingly, a determination is made whether a mapping between the search query and the process runner process is found. If a mapping does not exist, the flow proceeds to end 2306. If a mapping is found, the flow proceeds to block 2310. At Block 2310, the request handler of the search head issues a call to the process runner. The call is a command to move the search query to the new workload pool. The process runner for the search query processes the request in accordance with FIG. 24.

Figure 24:
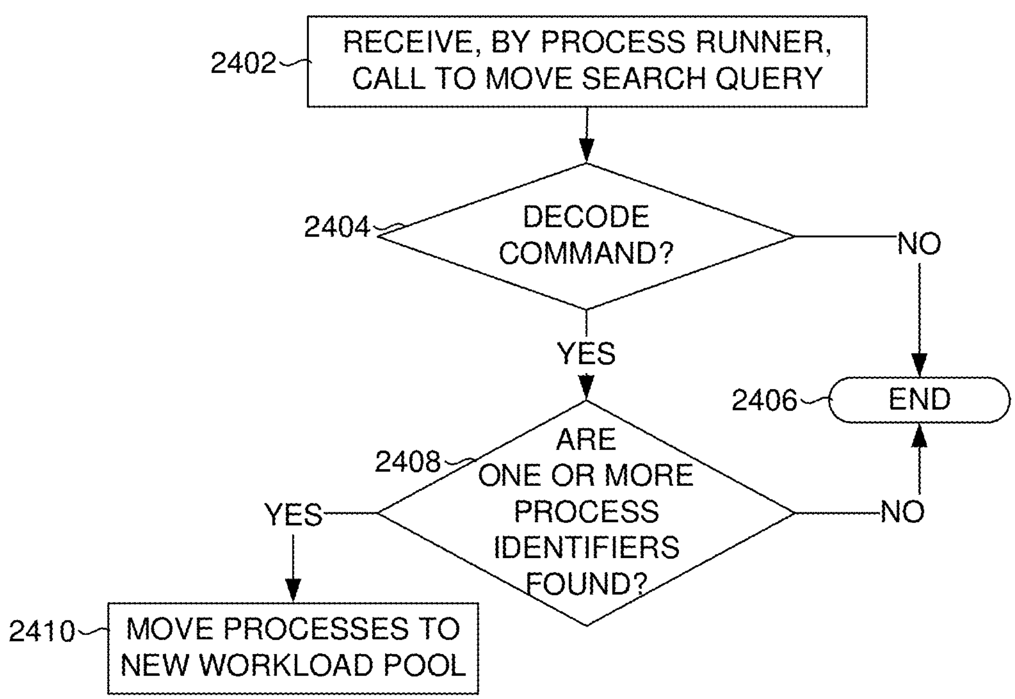
FIG. 24 illustrates a flowchart for a process runner to move a search query between workload pools in accordance with disclosed embodiments.

FIG. 24 illustrates a flowchart for a process runner to move a search query between workload pools in accordance with disclosed embodiments. At Block 2402, the process runner receives a call to move the search query. A determination is made by the process runner whether the command can be decoded at Block 2404. If the command cannot be decoded, then the flow proceeds to end 2406. If the command can be decoded, a determination is made whether one or more process identifiers for the search query are found at Block 2408. Specifically, the process runner searches a table to identify the processes related to processing the search query. If process identifiers cannot be found, then the flow proceeds to end 2406. If the processes can be found, the flow proceeds to Block 2410. At Block 2410, the processes are moved to the new workload pool. For example, an operating system call may be performed to request that the set of processes identified at Block 2408 are moved. The search process is signaled and informs its own process runner to move its set of child processes to the new workload pool. In one or more embodiments, forked grandchildren may be unaffected, but processes forked from this point onward will be assigned the new workload pool. For custom commands, the responsibility of tracking and moving its children is with the parent external command process in one or more embodiments. If the underlying operating system support structure is a Cgroup, then the processes are moved by issuing a calling requesting that the processes are moved to the new Cgroup.

To perform the move, in general, the controllers (e.g., CPU controller, memory controller, I/O controller, etc.) move the processes under those controller paths to the new workload pool. The processes may be moved, terminated, or paused. The operating system may perform different actions for different controllers. For the CPU, the operating system changes the share of the CPU according to the new workload pool. For memory, the operating system tracks used memory, and may terminate processes or swapping. The operating system may perform other actions for other controllers.

Although FIG. 22-24 are discussed with reference to processing search query requests, a similar process may be applied to process data ingest requests. Moving data ingest is contemplated herein as well as moving search queries.

Figure 25:
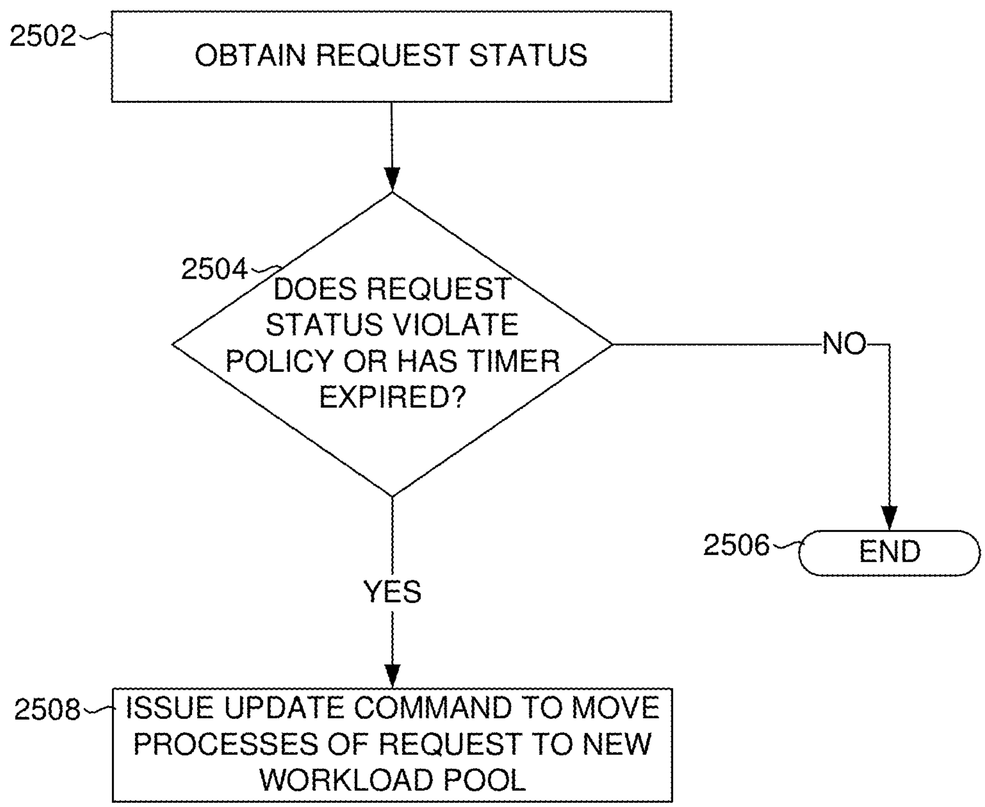
FIG. 25 illustrates a flowchart for performing a policy based movement of a search query between workload pools in accordance with disclosed embodiments.

FIG. 25 illustrates a flowchart for performing a policy based movement of a search query between workload pools in accordance with disclosed embodiments. At Block 2502, a request status is obtained. The request status includes the length of time that the request is processing. The request status may further include the amount of computing system resources used to process the request. A determination is made whether the request status violates a policy or whether a timer expired. For example, the policies to move a search query may be based on one or more of time, user, role, application, quota of search queries, etc. If the request status does not does not violate a policy or if a timer has not expired, the flow proceeds to end 2506. If the request status violates a policy or if the timer expired for the request, an update command is issued to move the processes of the request to the new workload pool. The update command may be processed as described below with reference to FIGS. 23 and 24.

Figure 26:
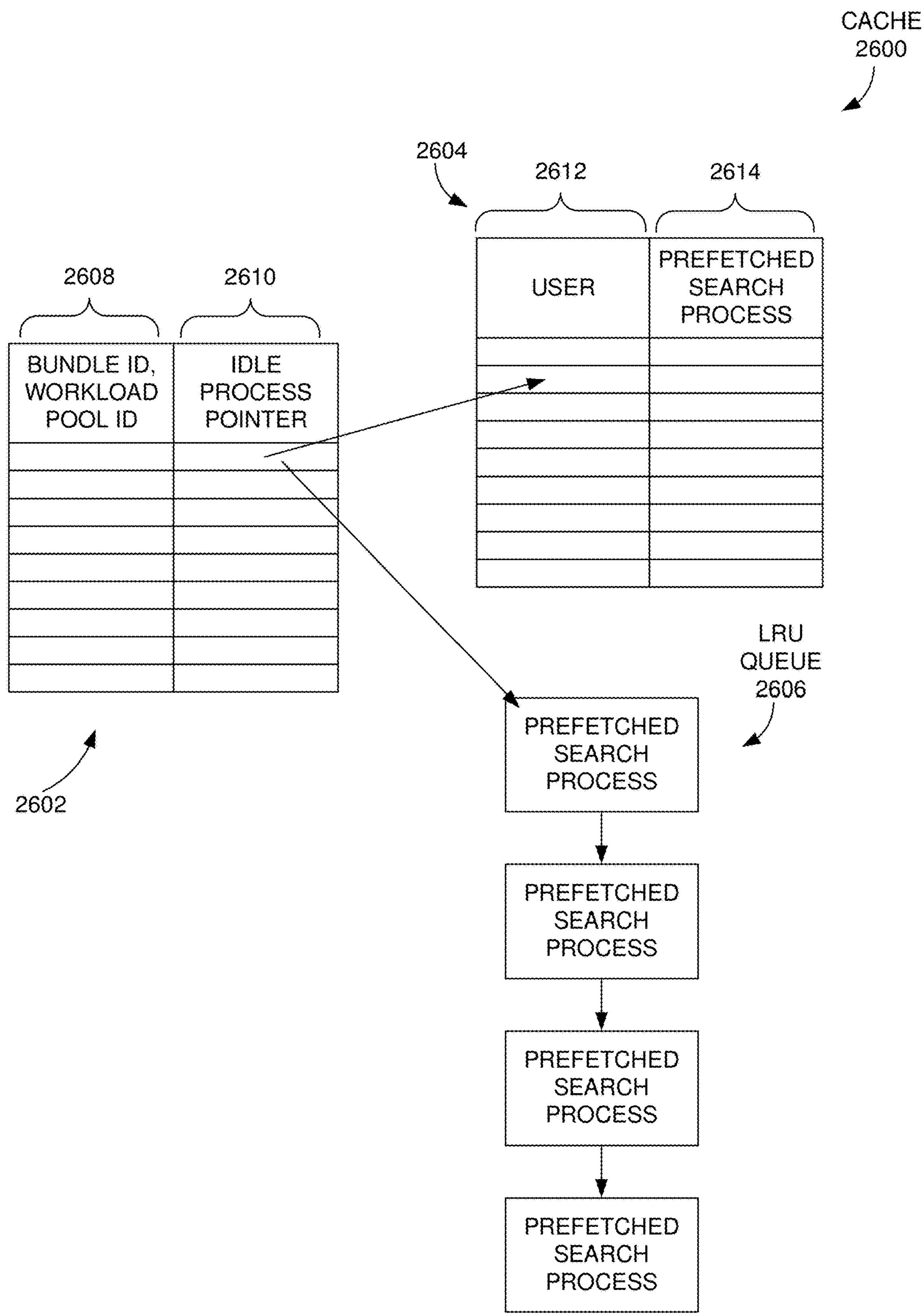
FIG. 26 illustrates a diagram of a cache for workload resource management in accordance with disclosed embodiments.

As described above, when a new search query is received by the search head, the search query may be processed using a cache. FIG. 26 illustrates a diagram of a cache for workload resource management in accordance with disclosed embodiments. As shown in FIG. 26, the cache 2600 includes multiple tables 2602, 2604 and least recently used queue 2606. Table 2602 includes multiple cache entries. Each cache entry may relate a bundle identifier and workload pool identifier pair 2608 to an idle process pointer 2610. The idle process pointer references an entry in a table 2610 that maps a user identifier 2612 to a prefetched search process 2614. The prefetched search process includes the information for conducting a search for the corresponding user identifier. Thus, the amount of time to search for the configurations for the search and perform other operations is minimal by having the prefetched search processes. The least recently used queue 2606 is a list of prefetched search processes that are not in use, which is used if a user-specific search process is not found.

Figure 27:
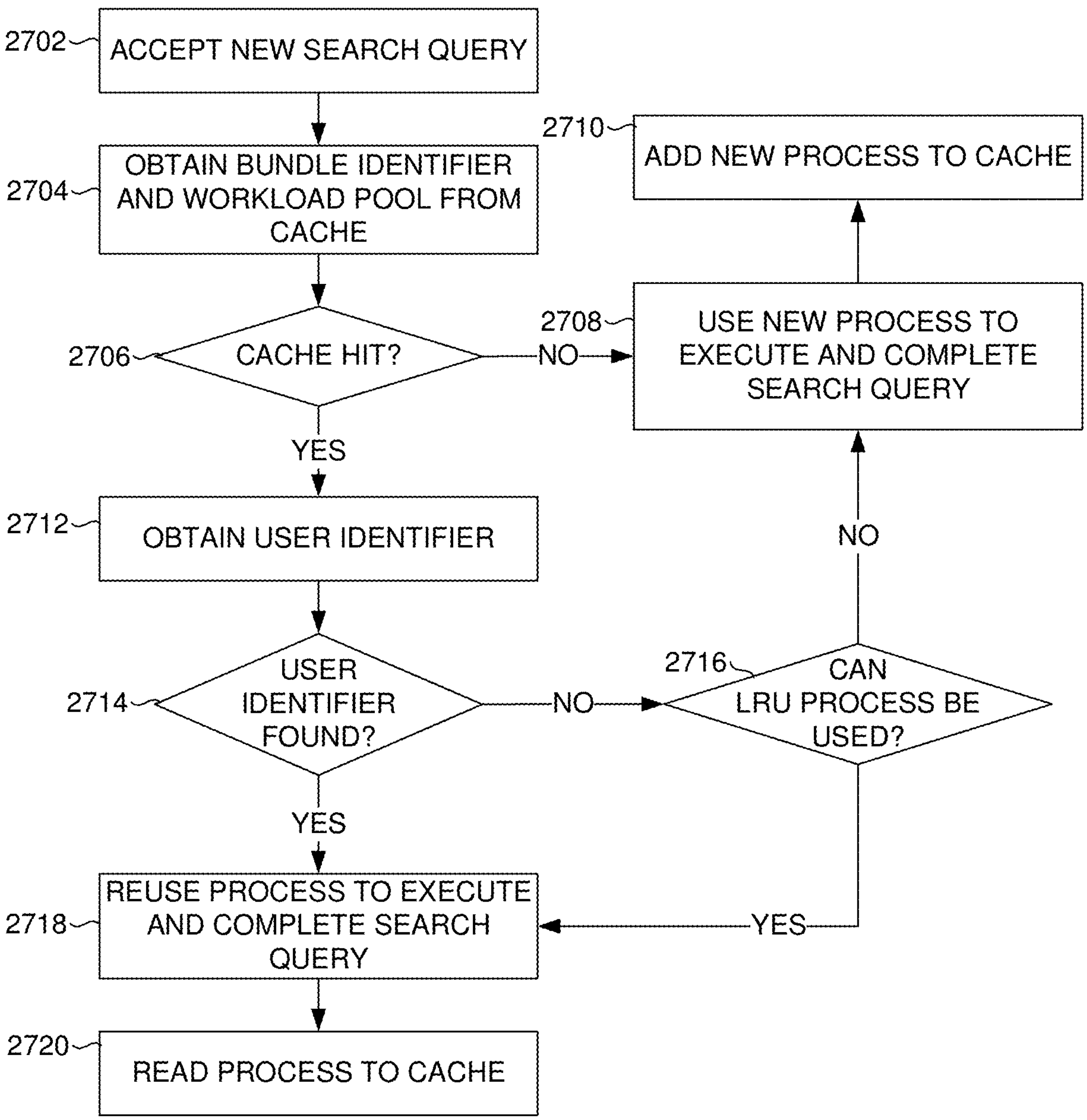
FIG. 27 illustrates a flowchart of a workload resource management of a cache in accordance with disclosed embodiments.

FIG. 27 illustrates a flowchart of a workload resource management of a cache in accordance with disclosed embodiments. At Block 2702, a new search query is received. The bundle identifier and the workload pool identifier for the new search query is obtained from the cache at Block 2704. The workload pool and the bundle identifier identifies the search with the correct configuration and rules applied. A search is performed to determine whether the bundle identifier and the workload pool identifier for the search query matches an entry in the cache. The determination is made in Block 2706 whether a cache hit exists. If a cache hit does not exist, then a new process is used to execute and complete the search query in Block 2708. The new process is added to the cache in Block 2710. If a cache hit exists, at Block 2712, the user identifier is obtained from the search query. A determination is made whether the user identifier may be found. If the user identifier is not found, the flow proceeds to block 2716. A Block 2716, a determination is made whether a least recently used process may be used. If a least recently used process cannot be used, the flow proceeds to Block 2708 to use a new process and add the new process to the cache at Block 2710. If the user identifier is found at Block 2714 or a least recently used process can be used at Block 2716, then the flow proceeds to Block 2718. At Block 2718, the process is reused to execute and complete the search query. When the execution of the search query is completed, then the process is read to the cache at Block 2720. From the cache, the process may be reused. The execution of the search query at Block 2708 and 2718 may be performed as described above with reference to FIG. 19.

Figure 28:
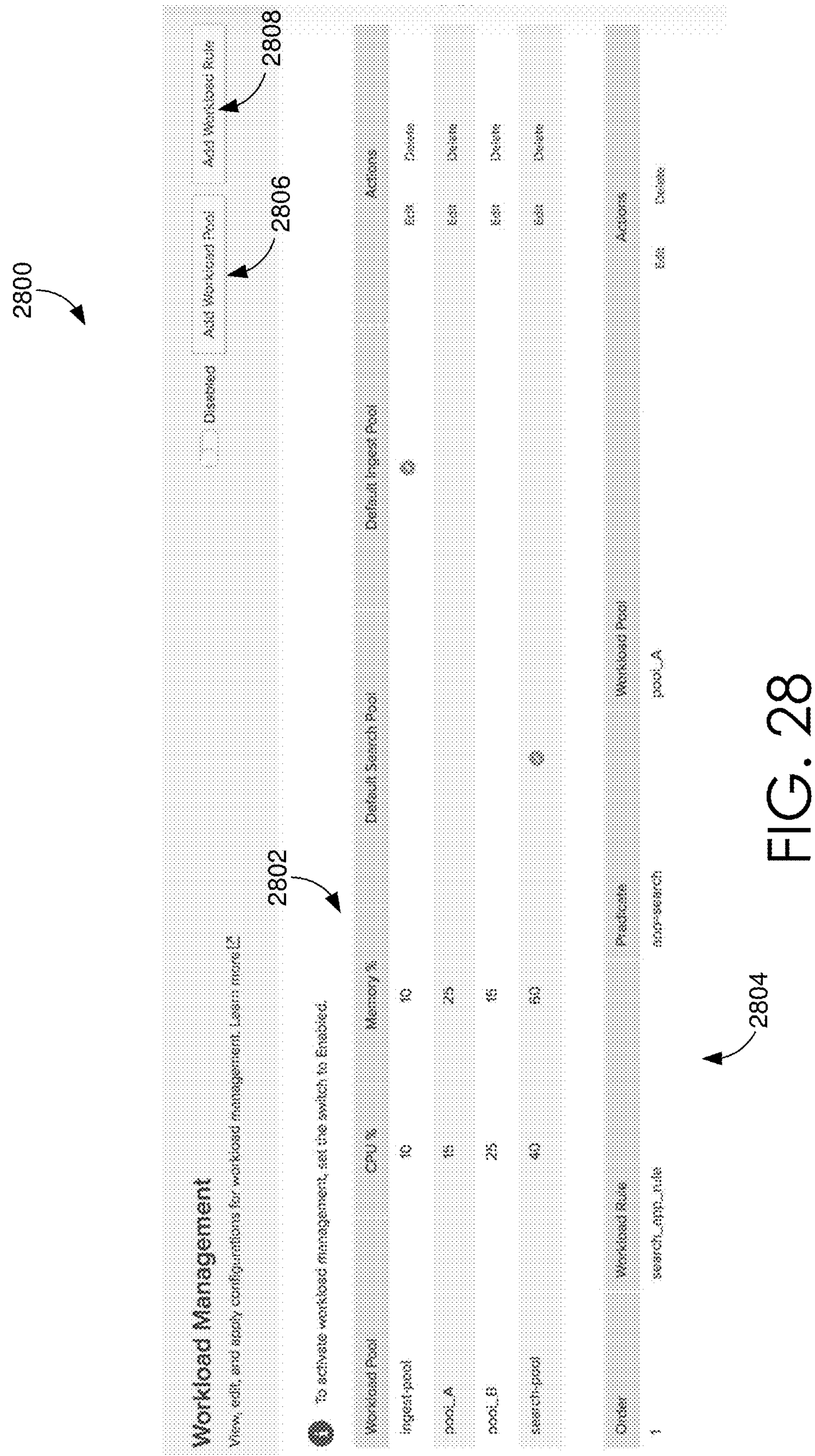
FIG. 28 illustrates an example workload management interface in accordance with disclosed embodiments.

The following example user interfaces are for explanatory purposes only and not intended to limit the scope of the disclosure unless explicitly claimed. FIG. 28 illustrates an example workload management interface in accordance with disclosed embodiments. As shown in FIG. 28, the workload management interface includes a table for workload pools 2802 and a table for workload rules 2804. Each row in the workload pools table 2802 presents information for a single workload pool. As shown, the information includes hardware resources allocated (e.g., percentage of CPU and memory) and whether the workload pool is a default workload pool. Users may submit a request to edit or delete the corresponding workload pool by selecting the corresponding boxes in the row of the corresponding workload pool.

The workload rules table 2804 includes a table of workload rules. The workload rules table 2804 includes one or more rows, where each row is for a single workload rule. The row includes a workload rule name, a predicate, and a workload pool identifier for the workload rule. The predicate shows the one or more criteria for the workload rule to be satisfied and the workload pool corresponding to the workload rule to be used. Users may submit a request to edit or delete the corresponding workload rule by selecting the corresponding boxes in the row of the corresponding workload rule.

Further, by selecting box 2806, a user may add a workload pool, and by selecting box 2808, the user may add a workload rule. When a selection to add a new workload pool is received, a workload pool selection interface is presented in the workload management interface. For example, the workload pool selection interface may be presented in the workload management interface, such as in a pane or popup window of the workload management interface.

When a selection to add a new criterion for a workload pool, such as by adding a new workload rule in the workload management interface, a workload rule interface is presented in the workload management interface. For example, the workload rule interface may be presented in the workload management interface, such as in a pane or popup window of the workload management interface.

Figure 29:
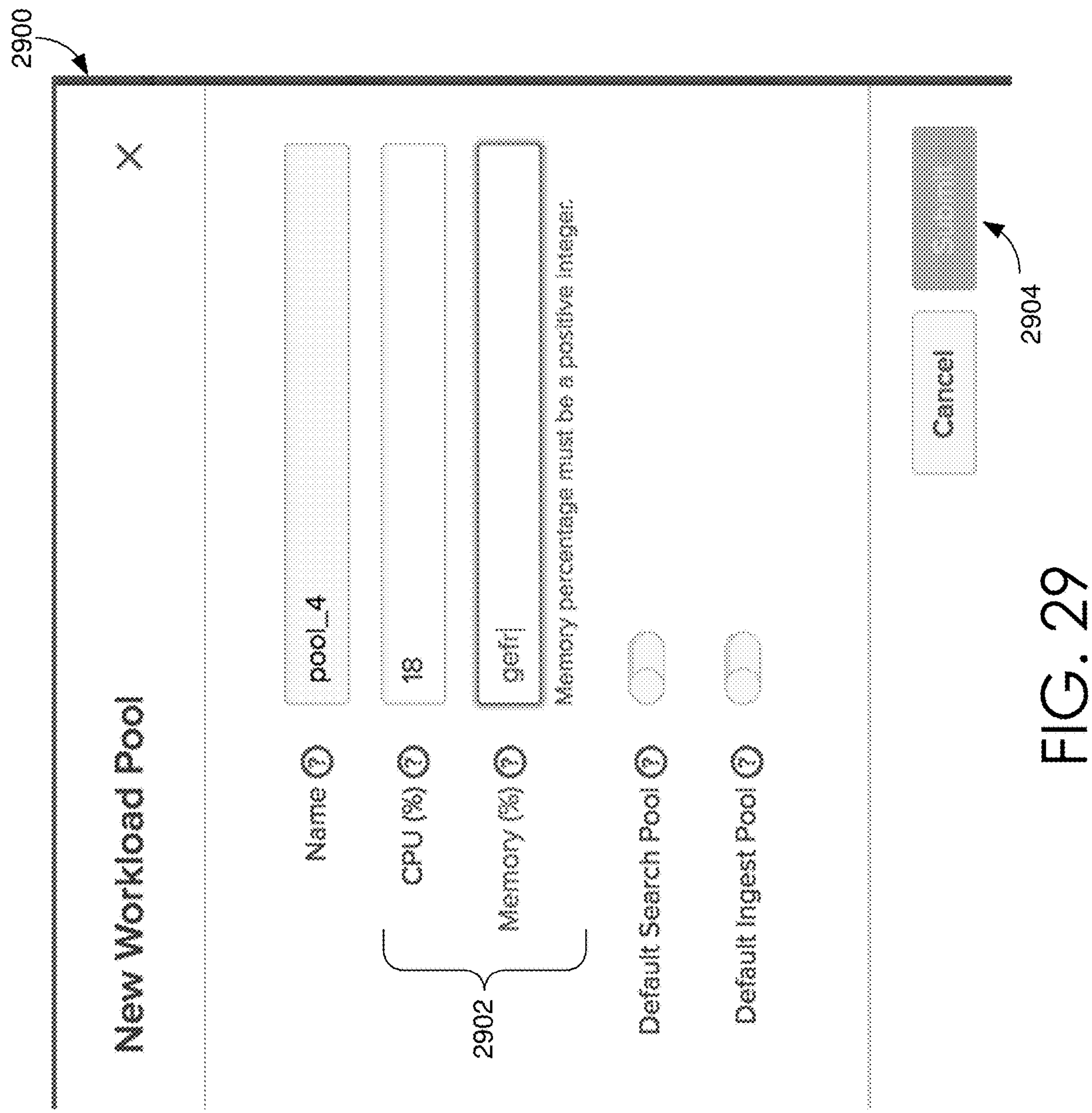
FIG. 29 illustrates an example workload pool selection interface in accordance with disclosed embodiments.

FIG. 29 illustrates an example workload pool selection interface 2900 in accordance with disclosed embodiments. In the workload pool selection interface 2900, the system may receive a name and an amount of each hardware resource. As shown in FIG. 29, the system may confirm that the amount satisfies input requirements. Using various widgets 2902, user may select the hardware resources for the workload pool. The hardware resources may be selected in dropdown boxes, text boxes, etc. The submission of the hardware resources may be a weight, a percentage, or an absolute value of the hardware devices. When the submit button 2904 is selected, the one or more criterion are related to the workload pool. For example, the percentile allocation of the hardware devices are assigned as hardware resources to the new workload pool. Thus, the new workload pool is created and added to the workload management interface.

Figure 30:
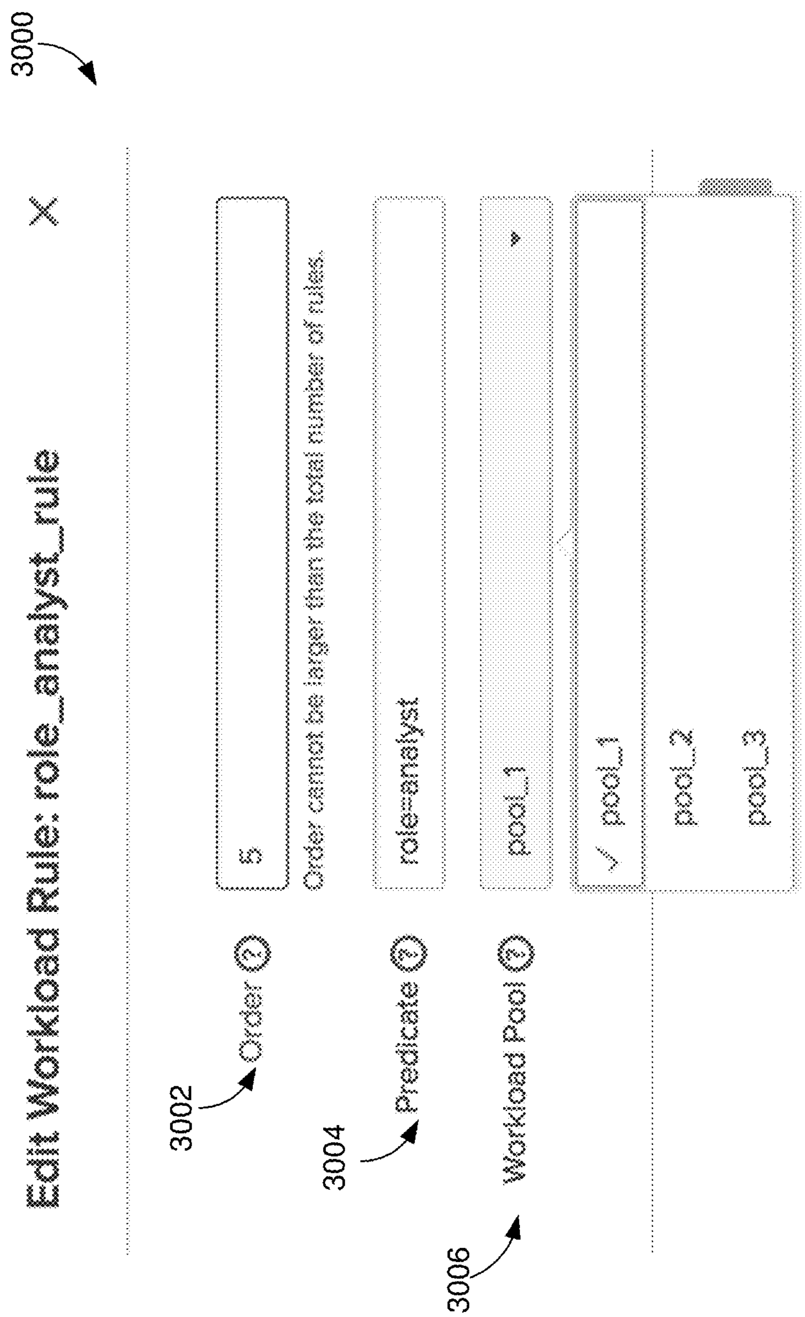
FIG. 30 illustrates an example workload rule interface to create a workload rule in accordance with disclosed embodiments.

FIG. 30 illustrates an example workload rule interface 3000 to create a workload rule in accordance with disclosed embodiments. In the workload rule interface 3000, the user may select the priority order 3002 for executing the workload rule. The user may select various criterion 3004 in the workload rule interface. The criterion may be selected by creating a predicate (as shown), selecting from one or more menu options (not shown), or using other widgets. Further, the user may assign a workload pool 3006 to the workload rule. When the new workload rule is submitted, the criterion is related to the workload pool through the assignment 3006.

Figure 31:
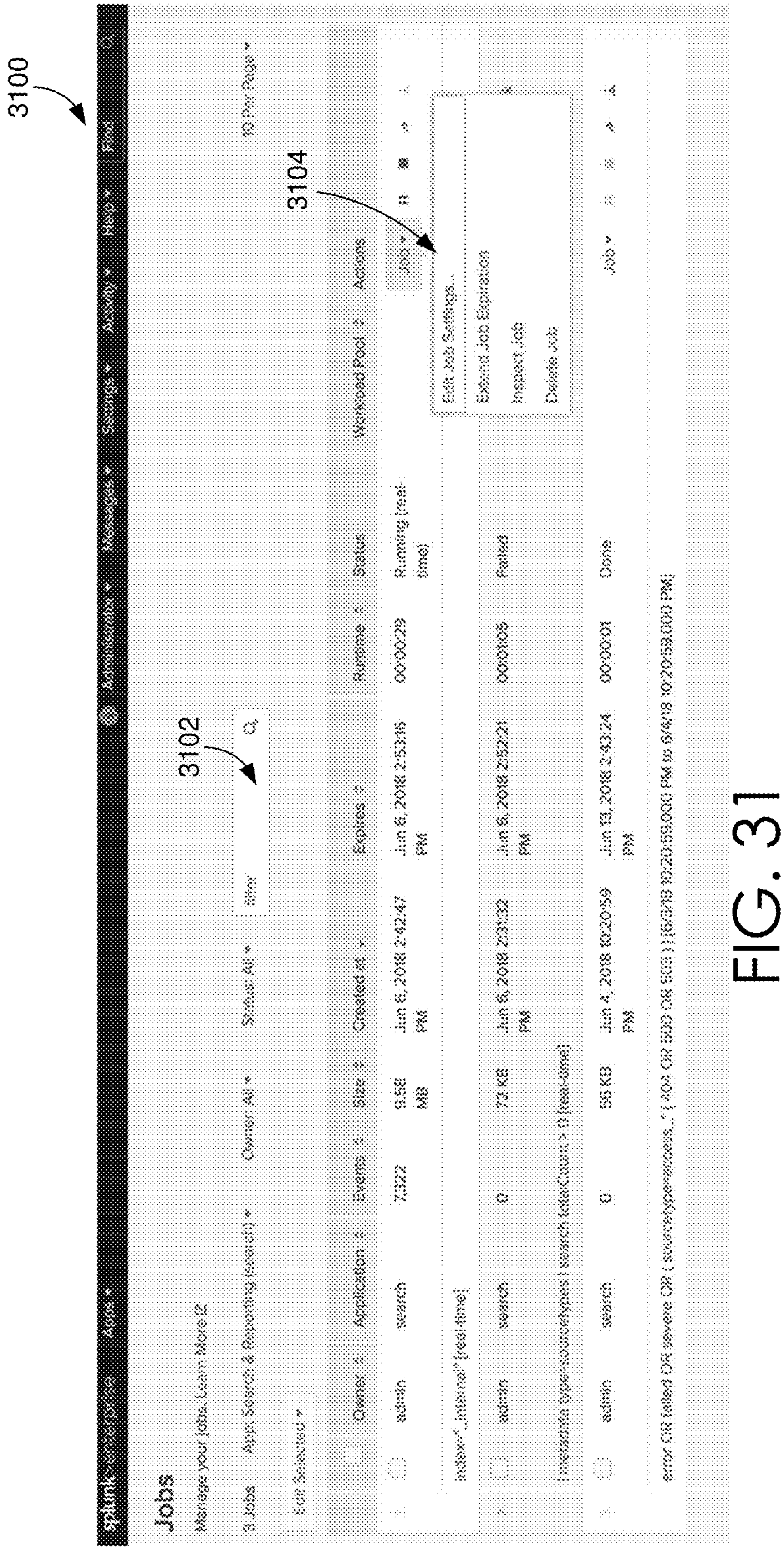
FIG. 31 illustrates an example jobs dashboard in accordance with disclosed embodiments.

FIG. 31 illustrates an example jobs dashboard 3100 in accordance with disclosed embodiments. In the jobs dashboard, a listing of jobs is presented as rows of a table. Each job is a row of a table and attributes of the jobs are presented. By selecting filter box 3102 and selecting the workload pool, a filter request is received and the jobs presented are listed that are in the workload pool. A user may also select an edit jobs setting menu option 3104 to displace an edit jobs settings interface.

Figure 32:
FIG. 32 illustrates an example jobs settings interface in accordance with disclosed embodiments.

FIG. 32 illustrates an example jobs settings interface 3200 in accordance with disclosed embodiments. The edit jobs settings interface is for editing the search query job corresponding to a search query. In the edit jobs settings interface 3200, a user may issue an update command to change the workload pool in box 3202. When the save box 3204 is received, the update command is processed to move the search query to a different resource pool.

Figure 33:
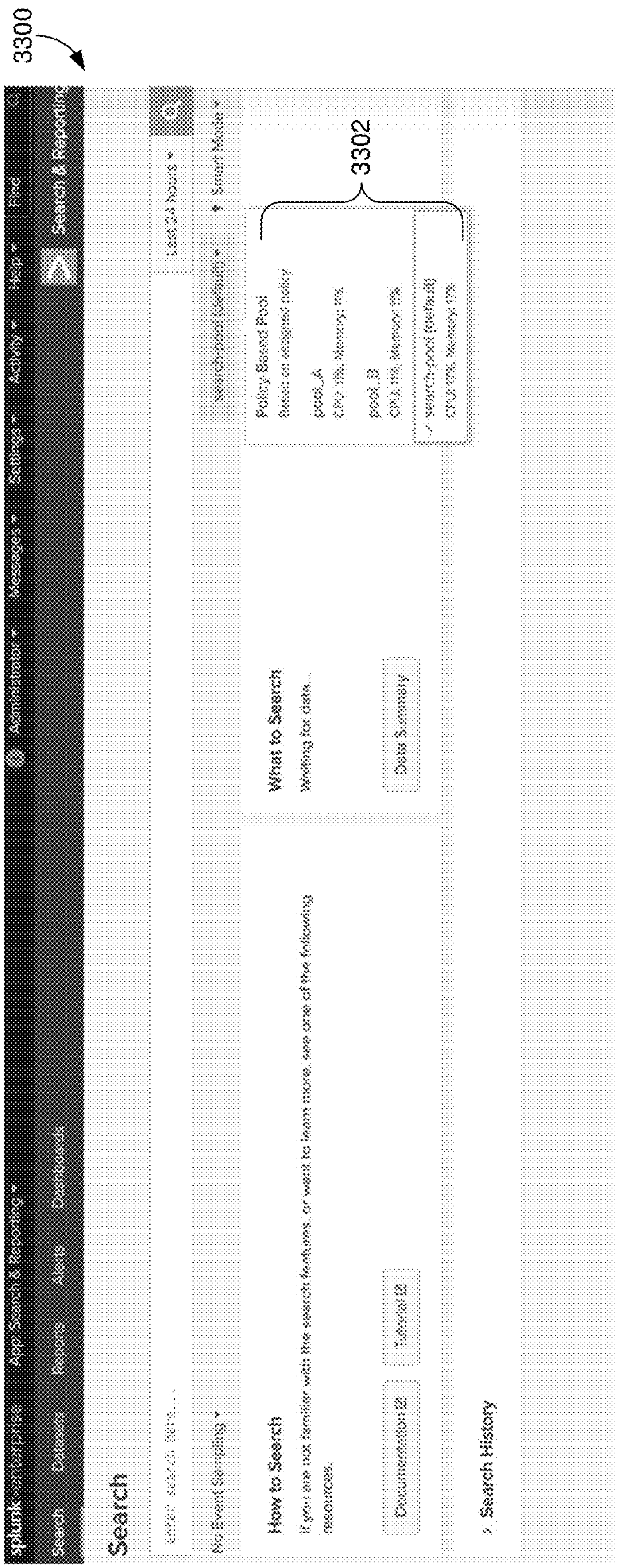
FIG. 33 illustrates an example search interface in accordance with disclosed embodiments.

FIG. 33 illustrates an example search interface 3300 in accordance with disclosed embodiments. The search interface is for creating a new search query to submit to the search head. In the search interface 3300, by selecting a workload pool from drop down menu 3302, the user may assign a workload pool to the search query. In other words, the drop down menu applies a workload pool assignment filter to the search.

Figure 34:
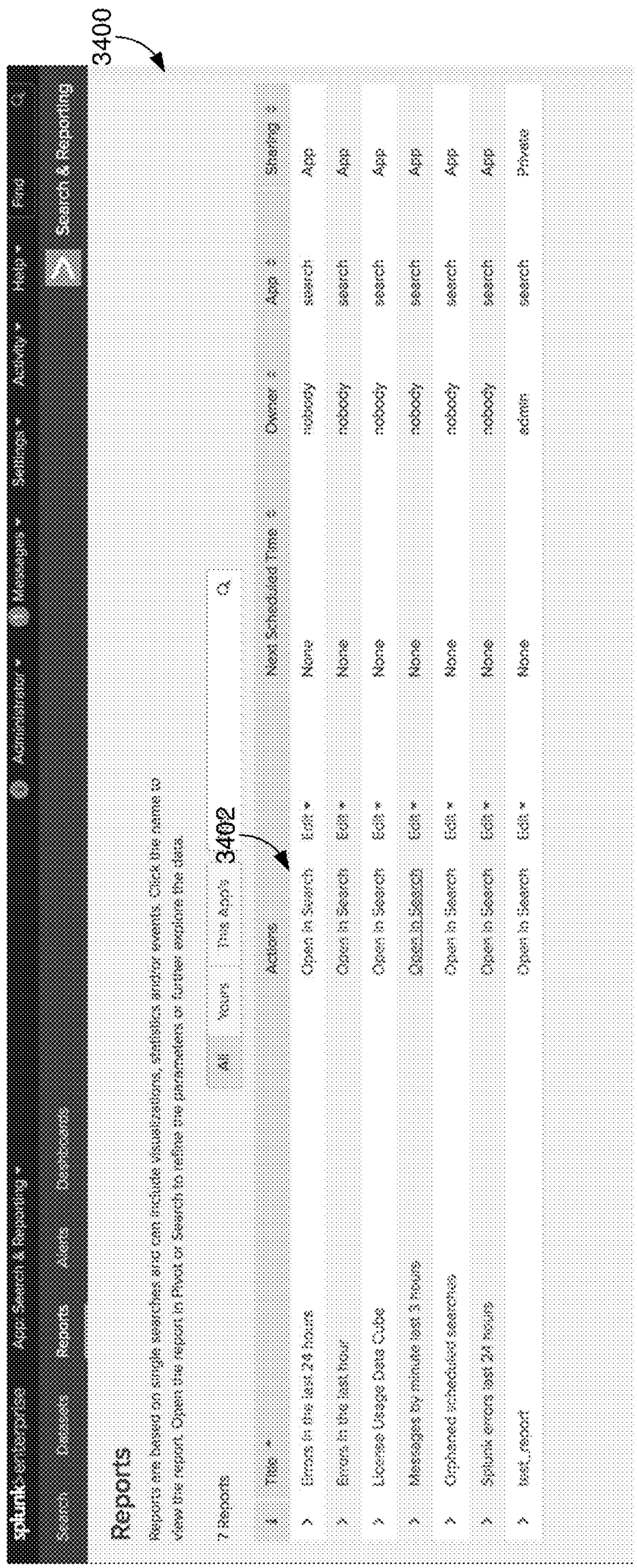
FIG. 34 illustrates an example reports interface with a workload pool assignment filter in accordance with disclosed embodiments.

FIG. 34 illustrates an example reports interface 3400 in accordance with disclosed embodiments. In the reports interface 3400, by selecting an open in search command 3402, the user may change the workload pool used for a saved search. Thus, the next time that a search query is submitted for the saved search, the new assigned workload pool is used.

Figure 35:
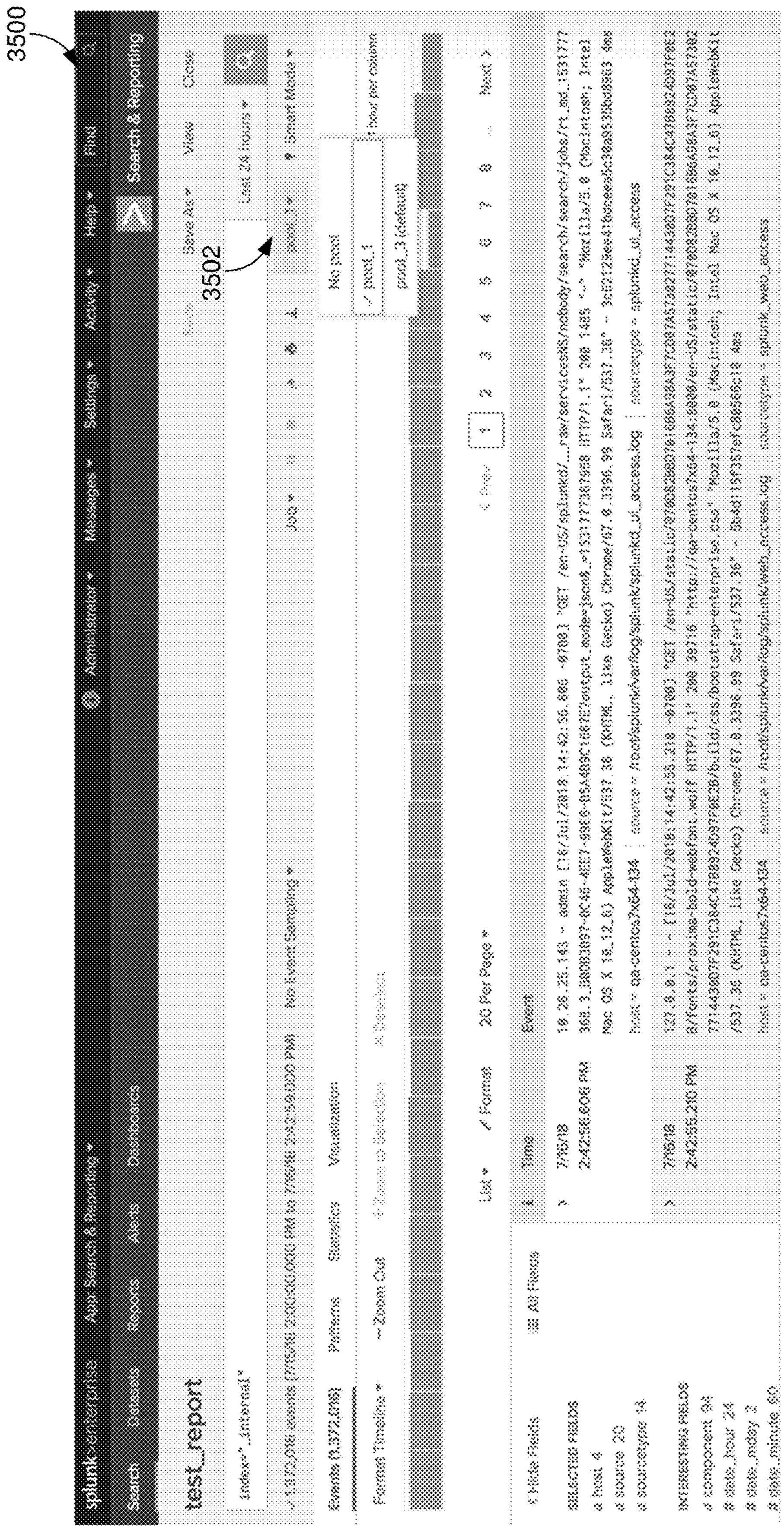
FIG. 35 illustrates an example events interface with a workload pool assignment filter in accordance with disclosed embodiments.

FIG. 35 illustrates an example events interface 3500 in accordance with disclosed embodiments. The events interface 3500 presents events that are added to the data store. A user may select a workload pool assignment filter 3502 identify events that are added based on data ingests in a particular workload pool.

4.0 Hardware

The various components of the figures may be a computing system or implemented on a computing system. For example, the operations of the data stores, indexers, search heads, host device(s), client devices, data intake and query systems, data sources, external resources, and/or any other component shown and/or described above may be performed by a computing system. A computing system may include any combination of mobile, desktop, server, router, switch, embedded device, or other types of hardware. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The computing system may be connected to or be a part of a network. For example, the network may include multiple nodes. Each node may correspond to a computing system, such as the computing system, or a group of nodes combined may correspond to the computing system. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system may be located at a remote location and connected to the other elements over a network.

The node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes in the network may be configured to provide services for a client device. For example, the nodes may be part of a cloud computing system. The nodes may include functionality to receive requests from the client device and transmit responses to the client device. The client device may be a computing system. Further, the client device may include and/or perform all or a portion of one or more embodiments of the disclosure.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the above figures show various configurations of components, other configurations may be used without departing from the scope of the disclosure. For example, various components may be combined to create a single component. As another example, the functionality performed by a single component may be performed by two or more components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:

storing, for a plurality of workload pools of a data intake and query system, a workload pool hierarchy arranged in a plurality of workload pool layers comprising:

a first layer comprising a node for allocating a set of workload pools of the plurality of workload pools to data intake and query system processes, a second layer partitioning the set of workload pools for data intake and query system processes into a first subset allocated for query processes, a second subset allocated for ingest processes, and a third subset allocated for user input processes, wherein the data intake and query system processes comprise the query processes, the ingest processes, and the user input processes, wherein the first subset, the second subset, and the third subset are disjoint, and wherein the ingest processes comprise processes to ingest data into the data intake and query system, the query processes comprise processes to query the data in the data intake and query system, and the user input processes comprise processes to monitor and manage the data intake and query system, and a third layer partitioning the first subset, the second subset, and the third subset into individual workload pools, wherein the individual workload pools are in leaf nodes of the workload pool hierarchy;

assigning a processing request to a subset selected from a group consisting of the first subset, the second subset, and the third subset based on a type of processing request, wherein the type of processing request is for one selected from a group consisting of the query processes, the ingest processes, and the user input processes;

assigning the processing request to an individual workload pool in the selected subset to obtain a selected workload pool; and initiating execution of the processing request on the selected workload pool, wherein each of the plurality of workload pools is a non-overlapping partition of hardware resources as defined by the workload pool hierarchy.

2. The method of claim 1, wherein the second subset is a single workload pool.

3. The method of claim 1, wherein the selected subset is the first subset, and wherein the method further comprises:

identifying a property of the processing request;

comparing the property to a criterion of each workload pool in the first subset to determine that a matching workload pool does not exist to select as the individual workload pool; and selecting, from the first subset, a default workload pool as the selected workload pool in response to the property not matching the criterion.

4. The method of claim 1, wherein initiating execution of the processing request comprises:

appending, to the processing request, a first workload pool identifier to create a modified processing request; and sending the modified processing request to a node for execution.

5. The method of claim 1, further comprising:

processing, by a first kernel resource manager on a first device, the processing request according to the selected workload pool; and processing, by a second kernel resource manager on a second device, the processing request according to the selected workload pool, wherein the processing by the first kernel resource manager and the second kernel resource manager are independent.

6. The method of claim 1, wherein the first subset comprises at least a fourth subset of workload pools that are each related to a set of criteria, wherein the set of criteria comprises at least one selected from a group consisting of an application criterion, a user role criterion, and a source type criterion.

7. The method of claim 1, further comprising:

obtaining a property of the processing request;

searching a cache using the property to obtain a cache entry; and allocating, based on the cache entry, hardware resources in the selected workload pool to the processing request.

8. The method of claim 1, wherein the selected workload pool comprises a memory resource, an input/output resource, and a hardware processor resource.

9. The method of claim 1, further comprising:

receiving an allocation of resources to the selected workload pool; and associating a criterion with the selected workload pool.

10. A system comprising:

memory comprising instructions; and a computer processor for executing the instructions that cause the computer processor to perform operations comprising:

storing, for a plurality of workload pools of a data intake and query system, a workload pool hierarchy arranged in a plurality of workload pool layers comprising:

a first layer comprising a node for allocating a set of workload pools of the plurality of workload pools to data intake and query system processes, a second layer partitioning the set of workload pools for data intake and query system processes into a first subset allocated for query processes, a second subset allocated for ingest processes, and a third subset allocated for user input processes, wherein the data intake and query system processes comprise the query processes, the ingest processes, and the user input processes, wherein the first subset, the second subset, and the third subset are disjoint, and wherein the ingest processes comprise processes to ingest data into the data intake and query system, the query processes comprise processes to query the data in the data intake and query system, and the user input processes comprise processes to monitor and manage the data intake and query system, and a third layer partitioning the first subset, the second subset, and the third subset into individual workload pools, wherein the individual workload pools are in leaf nodes of the workload pool hierarchy, assigning a processing request to a subset selected from a group consisting of the first subset, the second subset, and the third subset based on a type of processing request, wherein the type of processing request is for one selected from a group consisting of the query processes, the ingest processes, and the user input processes, assigning the processing request to an individual workload pool in the selected subset to obtain a selected workload pool, and initiating execution of the processing request on the selected workload pool, wherein each of the plurality of workload pools is a non-overlapping partition of hardware resources as defined by the workload pool hierarchy.

11. The system of claim 10, wherein the second subset is a single workload pool.

12. The system of claim 10, wherein the selected subset is the first subset, and wherein the operations further comprise:

identifying a property of the processing request;

comparing the property to a criterion of each workload pool in the first subset to determine that a matching workload pool does not exist to select as the individual workload pool; and selecting, from the first subset, a default workload pool as the selected workload pool in response to the property not matching the criterion.

13. The system of claim 10, wherein initiating execution of the processing request comprises:

appending, to the processing request, a first workload pool identifier to create a modified processing request; and sending the modified processing request to a node for execution.

14. The system of claim 10, wherein the operations further comprise:

processing, by a first kernel resource manager on a first device, the processing request according to the selected workload pool; and processing, by a second kernel resource manager on a second device, the processing request according to the selected workload pool, wherein the processing by the first kernel resource manager and the second kernel resource manager are independent.

15. The system of claim 10, wherein the first subset comprises at least a fourth subset of workload pools that are each related to a set of criteria, wherein the set of criteria comprises at least one selected from a group consisting of an application criterion, a user role criterion, and a source type criterion.

16. The system of claim 10, wherein the operations further comprise:

obtaining a property of the processing request;

searching a cache using the property to obtain a cache entry; and allocating, based on the cache entry, hardware resources in the selected workload pool to the processing request.

17. The system of claim 10, wherein the selected workload pool comprises a memory resource, an input/output resource, and a hardware processor resource.

18. The system of claim 10, wherein the operations further comprise:

receiving an allocation of resources to the selected workload pool; and associating a criterion with the selected workload pool.

19. A non-transitory computer readable medium comprising computer readable program code for performing operations, the operations comprising:

storing, for a plurality of workload pools of a data intake and query system, a workload pool hierarchy arranged in a plurality of workload pool layers comprising:

a first layer comprising a node for allocating a set of workload pools of the plurality of workload pools to data intake and query system processes, a second layer partitioning the set of workload pools for data intake and query system processes into a first subset allocated for query processes, a second subset allocated for ingest processes, and a third subset allocated for user input processes, wherein the data intake and query system processes comprise the query processes, the ingest processes, and the user input processes, wherein the first subset, the second subset, and the third subset are disjoint, and wherein the ingest processes comprise processes to ingest data into the data intake and query system, the query processes comprise processes to query the data in the data intake and query system, and the user input processes comprise processes to monitor and manage the data intake and query system, and a third layer partitioning the first subset, the second subset, and the third subset into individual workload pools, wherein the individual workload pools are in leaf nodes of the workload pool hierarchy;

assigning a processing request to a subset selected from a group consisting of the first subset, the second subset, and the third subset based on a type of processing request, wherein the type of processing request is for one selected from a group consisting of the query processes, the ingest processes, and the user input processes;

assigning the processing request to an individual workload pool in the selected subset to obtain a selected workload pool; and initiating execution of the processing request on the selected workload pool, wherein each of the plurality of workload pools is a non-overlapping partition of hardware resources as defined by the workload pool hierarchy.

20. The non-transitory computer readable medium of claim 19, wherein the selected subset is the first subset, and wherein the operations further comprise:

identifying a property of the processing request;

comparing the property to a criterion of each workload pool in the first subset to determine that a matching workload pool does not exist to select as the individual workload pool; and selecting, from the first subset, a default workload pool as the selected workload pool in response to the property not matching the criterion.

* * * * *